US008838787B2

(12) United States Patent
Gelter et al.

(10) Patent No.: US 8,838,787 B2
(45) Date of Patent: Sep. 16, 2014

(54) SYSTEM FOR OPTIMIZING LATENCY IN AN AVB NETWORK

(75) Inventors: Aaron Gelter, West Jordan, UT (US); Robert Boatright, Sandy, UT (US); Craig Gunther, Salt Lake City, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 182 days.

(21) Appl. No.: 13/307,873

(22) Filed: Nov. 30, 2011

(65) Prior Publication Data

US 2013/0138800 A1  May 30, 2013

(51) Int. Cl.
*G06F 15/173* (2006.01)

(52) U.S. Cl.
USPC ........................................................ 709/224

(58) Field of Classification Search
USPC ......... 709/224, 230, 231, 232, 233, 204, 205, 709/223; 370/260, 270
See application file for complete search history.

(56) References Cited

U.S. PATENT DOCUMENTS

| | | | | |
|---|---|---|---|---|
| 7,412,533 B1* | 8/2008 | Johnson et al. | ............... | 709/231 |
| 2003/0028661 A1* | 2/2003 | Burger et al. | ................. | 709/231 |
| 2005/0055454 A1* | 3/2005 | Welck et al. | ................. | 709/231 |
| 2005/0232576 A1* | 10/2005 | Godtland et al. | ............... | 386/46 |
| 2006/0056523 A1* | 3/2006 | Guillotel et al. | .............. | 375/259 |
| 2006/0083163 A1* | 4/2006 | Rosen | ........................... | 370/229 |
| 2006/0280182 A1* | 12/2006 | Williams et al. | ............... | 370/394 |
| 2007/0104105 A1* | 5/2007 | MeLampy et al. | ............ | 370/235 |
| 2008/0033986 A1* | 2/2008 | McCusker et al. | ............ | 707/102 |
| 2008/0259966 A1* | 10/2008 | Baird et al. | ................... | 370/503 |
| 2010/0070645 A1* | 3/2010 | Liu et al. | ....................... | 709/231 |
| 2010/0172379 A1* | 7/2010 | Guignard et al. | ............ | 370/503 |
| 2010/0228881 A1* | 9/2010 | Williams et al. | .............. | 709/248 |
| 2010/0235486 A1* | 9/2010 | White et al. | ................... | 709/223 |
| 2011/0228768 A1* | 9/2011 | Gelter et al. | .................. | 370/389 |
| 2011/0264790 A1* | 10/2011 | Haeuptle et al. | ............. | 709/224 |
| 2012/0063603 A1* | 3/2012 | Evans et al. | ..................... | 381/17 |
| 2012/0230348 A1* | 9/2012 | Pannell | ......................... | 370/437 |
| 2012/0327300 A1* | 12/2012 | Hutchings et al. | ........... | 348/515 |
| 2013/0034003 A1* | 2/2013 | Shapira | ........................ | 370/252 |

FOREIGN PATENT DOCUMENTS

EP    1394997 A1 *  3/2004

OTHER PUBLICATIONS

IEEE Standard for Local and metropolitan area networks—"Virtual Bridged Local Area Networks", Amendment 14: Stream Reservation Protocol (SRP), IEEE Computer Society, IEEE Std. 802.1Qat, New York, NY, Sep. 30, 2010, pp. i-103.

* cited by examiner

*Primary Examiner* — Kostas Katsikis

(74) *Attorney, Agent, or Firm* — Alleman Hall McCoy Russell & Tuttle LLP

(57) ABSTRACT

A network communication system includes a talker that may communicate a data stream having an optimal presentation time to a plurality of listeners over a network, such as an Ethernet Audio/Video Bridging network. The optimal presentation time may be determined by a maximum latency among a plurality of latencies for connections between the talker and the listeners. A controller may communicate with the listeners to determine the maximum latency. The controller may also provide the maximum latency to the talker and the listeners. The talker may determine the optimal presentation time based on the maximum latency. The listeners may allocate an optimum amount of resources to buffer the data stream before the data in the data stream is presented.

21 Claims, 7 Drawing Sheets

SYSTEM FOR OPTIMIZING LATENCY IN AN AVB NETWORK

BACKGROUND OF THE INVENTION

1. Technical Field

This invention relates to an Ethernet Audio-Video Bridging ("AVB") network, and more particularly to optimizing latency introduced in the AVB network.

2. Related Art

Audio/video ("A/V") data may be transmitted in a network system from a source endpoint to a destination endpoint. To reach the destination endpoint, the data may pass through bridges located in the network. When a bridge receives the data, the bridge may determine a next location (e.g., a next bridge) to send the data. The time taken for the bridge to receive the data, determine where to send the data, and send the data to the next location is a time delay or a latency that increases the total time that elapses for the data to reach the destination endpoint.

SUMMARY

A network communication system may include a talker that is configured to transmit a data stream to a plurality of listeners configured to receive the data stream over a network, such as an Ethernet Audio/Video Bridging (AVB) network. The data stream may include a presentation time that indicates a network time at which the plurality of listeners present the data in the data stream to physical media interfaces of the listeners. The plurality of listeners present the data to the physical media interfaces at the same presentation time or simultaneously to avoid undesirable time differences or phase differences between outputs, such as audio and/or video outputs, of the listeners.

The data stream may be transmitted over the network along paths connecting the talker with the listeners. One or more bridges may be included on the paths, which receive the data stream at an ingress port, determine a next location to send the data stream, and send the data stream to the next location toward one or more of the listeners. A time that the bridges take to perform these actions introduces a time delay or a latency that increases the time the data stream takes to be transmitted from the talker to the listener. The time delays or latencies that the data stream takes to be transmitted from the talker to the different listeners may be different. The time delays or latencies may be different because the data stream may pass through a different number of bridges to reach the different listeners. To compensate for the different time delays or latencies, a fixed offset value may be applied to a current network time to determine the presentation time. The fixed offset value may be a value that sets the presentation time far enough into the future so that the listeners may present the data simultaneously. The fixed offset value may be a predetermined value and/or that is indicative of a maximum amount that the current network time may be offset. If the fixed offset value did not set the presentation time far enough into the future, the presentation time may instruct or cause the listeners to present the data before all of the listeners receive the data stream.

In some situations, the fixed value over-compensates for the different time delays and sets a presentation time too far into the future. All of the listeners may have received the data stream, and yet the listeners continue to buffer the data stream rather than present the data because the network time has not yet reached the presentation time. As a result, system resources, such as buffer memory that buffers the data stream, is wasted, and performance of the network communication system is less than optimum.

System resources may be optimally allocated and the performance of the network communication system may be optimized for latency by determining a dynamic offset value that is based on actual latencies determined along the paths. In order to establish the paths to communicate the data stream, stream advertisements for a stream ID may be sent over the network by the talker that advertises that the talker wants to send the data stream. As the stream advertisements propagate along paths to the listeners, the stream advertisements may pass through the one or more bridges, and propagation delays may be determined for each passage through the bridges. Before sending the stream advertisements downstream toward the listeners, each bridge may add the delay or latency taken to pass the data stream through the bridge to a propagation delay field in the stream advertisement, indicating an accumulated propagation delay. When a listener receives the stream advertisement, the listener is able to determine a total or accumulated latency for the connection between talker and the listener. Each listener may be configured to send the accumulated latency information to a controller, which may be a high level application of one or more devices in the network communication system. The controller may be configured to determine a maximum latency and send the maximum latency information to the talker and/or the listeners.

The talker may determine an offset based on the maximum latency and generate a presentation time using the offset. The determined offset may be an optimal or minimal offset that optimizes or minimizes the presentation time. In addition, the listeners may determine an optimum or minimum amount of buffer memory to allocate to store the data stream until the listeners may simultaneously present the data. The listeners may make the determination based on the received maximum latency. By determining a presentation time and allocating buffer memory based on the maximum latency, the resources and/or performance of the network communication system may be optimized.

The number of listeners in the network communication may change, which may change the maximum latency in the network communication system. The controller may be configured to determine the change in the number of listeners, and further determine a different maximum latency based on the change in the number of listeners. The controller may be configured to inform the talker and the listeners of the different maximum latency. The talker and the listeners may remove the connections between them and stop communicating the data stream having the presentation time based on the original maximum latency. The talker may further determine a new offset and/or a new presentation time and transmit the data stream having the new presentation time.

The presentation time included in the data stream is based on an offset determined by actual latencies identified as the stream advertisements are sent through the network. The offset may be a dynamic offset that changes as latencies in the system change due to listeners connecting to and/or disconnecting from the network communication system, resulting in different numbers of listeners. As the number of listeners change, the maximum latency is updated and provided to the talker and listeners to generate optimal presentation times and optimally allocate the resources to buffer the data stream.

Other systems, method, features and advantages will be, or will become, apparent to one with skill in the art upon examination of the following figures and detailed description. It is intended that all such additional systems, method, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Demand for connectivity between network devices continues to increase at a fast rate. In many systems, a greater number of devices are being manufactured which have network connection and/or communication capabilities. For example, in some automobiles, components not previously considered connective are being manufactured with connective capabilities. Parts, such as brakes, throttle, and/or various other parts, may be manufactured as Ethernet Audio-Video Bridging ("Ethernet AVB") enabled devices which may communicate through an Ethernet AVB network. In some systems, Ethernet AVB networks may be used to connect one or more devices, with audio and/or video data streams being sent wirelessly and/or through a wireline, such as an Ethernet cable.

Figure 1:
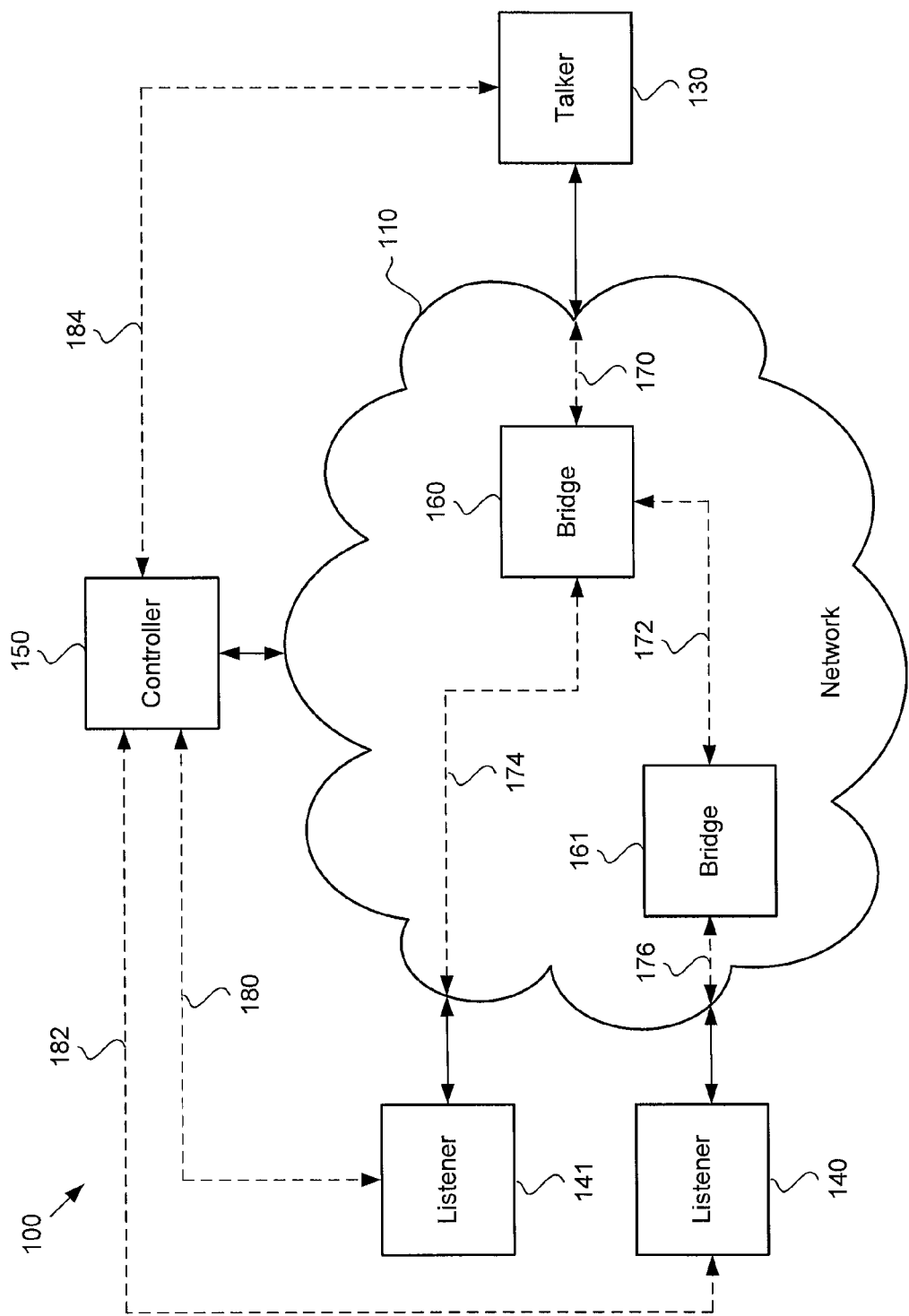
FIG. 1 is a block diagram of an example network communication system.

FIG. 1 illustrates an example network communication system 100 that may include a plurality of electronic devices, including electronic devices 130, 140, 141, and 150. More or fewer electronic devices may be included. One or more of the electronic devices of the system 100, including the talkers 130, the listeners 140, 141, and the controller 150, may be in communication with one or more of the other electronic devices over the network 110. In addition, each electronic device 130, 140, 141, 150, may be configured to perform one or more roles. The roles may include the role of a talker, the role of a listener, the role of a controller, and/or any combination of these three roles.

The role of the talker may be to transmit information and/or data across the network 110. Alternatively or in addition, the role of the talker may be to establish, create, and/or reserve a connection for the transmission of a data stream carrying the information and/or data. Alternatively or in addition, the role of the talker may be to remove or tear down the connection. The role of the listener may be to receive the information and/or the data that has been sent over the network 110. Alternatively or in addition, the role of the listener may be to connect to and/or reserve connection to the data stream. Alternatively or in addition, the role of the listener may be to remove connection from the data stream.

The role of the controller may be to control the flow of the data stream between the talker and one or more of the listeners. The controller may control the flow of the data stream by sending one or more messages, such as command messages, to the talker and/or the listeners to create a connection and/or remove the connection of the data stream between the talker and the listeners. The messages may be communicated to the talker and/or the listeners through a high-level application layer of the talker and/or the listeners. In addition or alternatively, the role of the controller may be to determine an optimal or maximum latency between the talker and one or more of the listeners. Other roles may be included.

The electronic devices 130, 140, 141, and/or 150 may be configured to switch between or change roles. For example, in one situation, one of the electronic devices may be configured to be a talker, and in another situation, the electronic device may be configured to be a listener. In yet another situation, the electronic device may be configured to be both a talker and a listener.

The electronic devices 130, 140, 141, and/or 150 may be configured to perform different roles in different situations or at different times. For example, in one situation, one of the electronic devices may be configured to be a talker. In a different situation, that electronic device may be configured to be a listener. Alternatively, the roles that the electronic devices 130, 140, 141, and/or 150 may be configured to perform may be fixed. For the following description, the electronic devices 130, 140, 141, and 150 in the system 100 are designated the roles of the talker, the listener, and the controller, as previously described. The electronic device 130 is configured as the talker, the electronic devices 140, 141 are configured as the listeners, and the electronic device 150 is configured as the controller. In an alternative communication network system, other roles may be designated. In addition, in an alternative system, there may be more than the one talker 130, more or fewer than the two listeners 140, 141, and/or more than the one controller 150. In still other examples, the same electronic device may perform as a talker or a listener while also being a controller.

The network 110 may be, include, and/or communicate through or with an Ethernet AVB network. The electronic devices in the communication system 100, including the talker 130, the listeners 140, 141, and/or the controller 150 may communicate over the network 100 using various protocols designated by the Institute of Electrical and Electronics Engineers (IEEE), including IEEE 802.1AS-2011 (gPTP) for network timing and synchronization, IEEE 802.1Qav-2009 for queuing and forwarding streaming data, IEEE 802.1Qat-2010 (Stream Reservation Protocol (SRP)) for reserving data stream bandwidth in a network, and/or IEEE 1722-2011 related to a possible data streaming format. Various other protocols may be used. Alternatively or additionally, the network 110 may be, include, and/or communicate through or with wide area networks (WAN), such as the Internet, local area networks (LAN), campus area networks, metropolitan area networks, or any other wireless and/or wireline networks that may allow for data communication. The network 110 may be divided into sub-networks. The sub-networks may allow access to all of the components connected to the network 110, or the sub-networks may restrict access between the components connected to the network 110. The network 110 may be regarded as a public or private network and may include, for example, a virtual private network, an encryption, or any other security mechanism employed over the public Internet, or the like. Various other types of networks 110 are possible.

One or more of the talker 130, the listeners 140, 141, and/or the controller 150 may be connected to the network 110, such as an Ethernet AVB network, in any configuration that supports data transfer. This may include a data connection to the network 110 that may be wired or wireless. One or more of the talker 130, the listeners 140, 141, and/or the controller 150 may be connected to the network 110 and/or to each other through or with an Ethernet connection, such as using a cable or wireless connection to an Ethernet AVB network. Various other connections may be possible.

The talker 130 may be configured, adapted, operable, and/or enabled to send information and/or data through the network 110. For example, the talker 130 may be configured and/or adapted to send a stream of information that includes data, commands, and/or command signals through, using, or across an Ethernet AVB network. Information and/or data sent by the talker 130 through the network 110, such as through an Ethernet AVB network, may be received by other devices connected with the network 110, such as listeners 140, 141 and/or the controller 150.

The talker 130 may transmit, send, output, and/or advertise processed information and/or data to the network 110, such as in, with, and/or using a data stream and/or Ethernet AVB signal. For example, the talker 130 may advertise a data stream encompassing data related to music played by a user on a device (e.g., a MPEG-1 or MPEG-2 Audio Layer III (MP3) player or an electronic musical keyboard) connected with the talker 130 onto an Ethernet AVB network. The information and/or data advertised by the talker 130 on the network 110 may be received by other devices, such as by the 140, 141, and/or the controller.

The talker 130 may have one or more talker attributes. A talker attribute may specify, include and/or otherwise identify characteristics about the talker 130 and/or a data stream advertised by a talker 130. One talker attribute may include multiple pieces of information and/or data. The talker attribute may include, identify, specify, and/or be related to a single piece of information and/or data, and the talker 130 may have multiple talker attributes. Alternatively, the talker attribute may include, identify, specify, and/or be related to multiple pieces of information and/or data, and the talker may have only a single talker attribute. Various combinations are possible.

The talker attribute may indicate and/or advertise that the talker 130 may have a data stream, such as an audio, video, and/or command data stream, that the talker 130 will multicast over the network 110. In addition or alternatively, the talker attribute may indicate how much bandwidth a data stream advertised by a talker 130 may require in order to be transmitted through the network 110. The amount of bandwidth specified may be used by bridges and/or switches in the network 110 to determine if there is enough bandwidth capability to reserve the amount of bandwidth at each switch in the path between the talker 130 and the listener 140. In one example, the listener 140 may not be concerned with the amount of bandwidth because one or more of the switches and/or bridges may indicate a failure due to bandwidth constraints before the listener receives bandwidth information specified in the attribute.

In addition or alternatively, a talker attribute may specify a destination address to which to send the data stream. The destination address may identify one or more particular listeners, such as the listener 140 and/or the listener 141. Alternatively, the destination address may be a multicast destination address that allows any listener in the network system 100 (in this case both the listener 140 and the listener 141) to receive and/or process the data stream being advertised once the reservation is in place and transmission has begun.

In addition or alternatively, the talker attribute may specify a unique stream identifier ("ID") for a data stream advertised by the talker 130. The stream ID may be a unique sequence of characters and/or numbers which may only be assigned to one stream. In some systems, no two streams may have the same stream ID. The unique stream ID may be a 64 bit stream ID, or various other stream IDs may be used. An assignment and/or identification of the stream ID may be used and/or performed by devices, such as the listener 140, to identify a stream for which the device wants to attach itself. For example, the listener 140 may receive over the network 110 a message, such as an advertisement, that includes a unique stream ID and may, based on the identification of the stream ID, request attachment, such as connection, to the stream associated with the stream ID. Various other uses of the stream ID are possible. The talker 130 may be configured to assign the stream ID to the stream at a time that the talker 130 is manufactured, such as by a manufacturer, after manufacture, such as at a time that the talker 130 connects with the network 110, and/or at various other times. Alternatively or in addition, a talker attribute may include a propagation delay from the talker 130 to one of the listeners 140, 141. The propagation delay may include an "on the wire" delay or latency between the talker 130 and one of the listeners 140, 141. "On the wire" delay may be a time that the data stream takes to be communicated between electronic devices, including the time between being transmitted by one electronic device and being received by another electronic device. The "on the wire" delay may include the time that the data stream takes to be communicated between a talker and a bridge, a listener and a bridge, and/or between bridges. The propagation delay may also include a delay or latency from an ingress port to an egress port of one or more bridges in the network 110.

One or more talker attributes may be stored in the talkers 130, the listeners 140, 141, and/or the controllers 150. For example, a unique stream ID of the talker 130 may be sent to and/or received by the controller 150, which may record and/or store the unique stream ID of the talker 130 and/or forward the unique stream ID of the talker 130 to one or more of the listeners 140, 141. The talker attributes may or may not be sent through, with, or using a non-SRP protocol. Various other uses and functions of talker attributes are possible.

Before transmitting the data stream, the talker 130 may advertise that the talker 130 wants to transmit the data stream over the network 110 and/or reserve a path over the network 110 between the talker 130 and one or more of the listeners 140, 141. Alternatively, the talker 130 may advertise that the data stream is unable to be transmitted to one or more of the listeners 140, 141. To advertise over the network 110, the talker may transmit a stream advertisement. The stream advertisement may be a signal and/or other transmission from the talker 130 which may be passed through the network 110. A stream advertisement may indicate that the talker 130 has a data stream that it can, cannot, will, or will not send, multicast, and/or otherwise transmit over the network 110. The stream advertisement may include a Talker Advertisement ("TA") or a Talker Failed ("TF"). The TA may be an advertisement for a stream that has not encountered any bandwidth or other network constraints along the network path from the talker. The TF may be an advertisement for a data stream that is not available to one or more of the listeners 140, 141 because of bandwidth constraints or other limitations somewhere along the path from the talker 130. In some situations, if a bridge or switch along a path from the talker to listener does not have sufficient bandwidth or resources available, the bridge or switch may change the TA message to a TF message before forwarding it toward one or more of the listeners 140, 141.

The stream advertisement may include details about the data stream, such as one or more talker attributes that may be sent with and/or included in a stream advertisement advertised and/or output by the talker 130. For example, the stream advertisement may include the stream ID of the data stream being advertised by the talker 130. The stream advertisement may be transmitted across the network 110 to and/or received by one or more of the listeners 140, 141. In addition, the stream advertisement may include the propagation delay from the talker 130 to one of the listeners 140, 141.

One or more of the listeners 140, 141 may receive the stream advertisement. If one of the listeners 140, 141 wishes to receive the data stream being advertised by the TA, the listener 140, 141 may send a response message, such as a Listener Ready ("LR") message, over the network 110 and/or to the talker 130. The signal may be a request to attach to the data stream via the stream ID, which may be included in the stream advertisement. When a bridge or switch in the AVB network 110 receives the LR from the listener 140, 141, the bridge may match the LR with the TA and allow the data stream referenced by the stream advertisement to be sent to the requesting listener 140, 141. One or more listeners 140, 141 request and/or attach to the same data stream via one stream ID. One of the listeners 140, 141 may request and/or attach to more than one data stream via the stream IDs of each requested data stream. Other variations are possible.

Each listener 140, 141 may have one or more listener attributes or listener properties. The listener attributes or properties may or may not contain a single piece of information, such as a stream ID that the listener may want to attach to. One or more listener attributes may be sent with, through, and/or using the network 110. One or more listener attributes may be sent to, accessed by, and/or received by one or more receiving devices on the network 110, such the talkers 130 and/or the controllers 150. One or more listener attributes may be stored in one or more of the talker 130, the listeners 140, 141, and/or the controller 150. One or more listener attributes may be used to connect a listener with a data stream and/or the talker 130. Various other uses and functions of listener attributes are possible.

The listener attributes or properties may specify, include, and/or otherwise identify characteristics about one or more of the listeners 140, 141. Listener attributes may, for example, exist and/or be used outside of a stream reservation protocol stack within a talker or a listener, and/or may be used to inform devices on the network 110 about the attributes or properties of one or more of the listeners 140, 141. For example, a listener attribute may specify what talkers (e.g., the talker 130) that one or more of the listeners 140, 141 may be interested in. A listener attribute or property may include the stream ID. A listener attribute or property may identify one or more capabilities of one or more of the listeners 140, 141, such as bandwidth that one or more of the listeners 140, 141 has available, a type of data stream that one or more of the listeners 140, 141 may be interested in and/or capable of processing, and/or various capabilities of one or more of the listeners 140, 141. A listener attribute or property may additionally or alternatively specify various other pieces of information and/or data about one or more of the listeners 140, 141. One listener attribute may include multiple pieces of information and/or data. In some systems, each listener attribute may be related to only one piece of information and/or data, and each listener 140, 141 may have multiple listener attributes. In other systems, each listener 140, 141 has only one listener attribute which specifies multiple pieces of information and/or data about one or more of the listeners 140, 141. The listener attributes may exist and/or be used within or outside of SRP and/or may include some or all of the listener attributes or properties described. Various combinations are possible.

One or more of the listeners 140, 141 may respond to a stream advertisement sent by the talker 130. The response message may be, for example, a Listener Ready (LR), a Listener Ready Failed (LRF), and/or a Listener Asking Failed (LAF) message. As previously described, the LR message may indicate that one or more of the listeners 140, 141 is requesting attachment to the data stream, and that there is sufficient bandwidth and/or resources along one or more paths to the talker 130 for all of the listeners 140, 141 to receive the data stream. The LRF message may indicate that more than one of the listeners 140, 141 are requesting attachment to the data stream, and that one of the listeners 140, 141 has sufficient bandwidth and/or resources along the path to receive the data stream, but one or more of the listeners 140, 141 is unable to receive the data stream because of network bandwidth and/or resource allocation problems. The LAF message may indicate that one or more of the listeners 140, 141 are requesting attachment to the data stream, but that none of the listeners 140, 141 are able to receive the data stream because of network bandwidth and/or resource allocation problems. One or more of the listener attributes may be included in the LR message, the LRF message, and/or the LAF message. The talker 130 may receive the response message, and in response to receiving the message, the talker 140 may reserve and/or establish one or more paths to one or more of the listeners 140, 141 and/or send the data stream to the one or more of the listeners 140, 141.

The network 110 may include one or more bridges which may communicate with one or more of the talker 130, the listeners 140, 141, and/or the controller 150 communicating through and/or connected with the network 110. The example network communication system 100 shown in FIG. 1 includes two bridges 160, 161, although other numbers of bridges may be included. The bridges 160, 161 may communicate with the network 110 and/or the devices 130, 140, 141, and/or 150. Paths may be established within the network 110 that connects the bridges 160, 161 together and/or that connects the bridges 160, 161 with the talker 130 and/or the listeners 140, 141. As examples, a path 170 may be established that connects the talker 130 with the bridge 160, a path 172 may be established that connects the bridge 160 to the bridge 161, a path 174 may be established that connects the bridge 160 to the listener 141, and a path 176 may be established that connects the bridge 161 to the listener 140. One or more of the paths 170-176 may be removed, torn down, and/or re-established (as denoted by the dotted lines) to remove and/or re-establish communication between the talker 130 and the listeners 140, 141. In addition or alternatively, other paths may be established, removed, torn down, and/or re-established in the network 110 to establish connection between one or more of the talker 130, the listeners 140, 141, and the controller 150, and/or between the bridge 160 and the bridge 161.

The bridges 160, 161 may be connected to the network 110 through or using the various protocols designated by the IEEE, such as the Ethernet AVB. For example, the bridges 160, 161 may communicate with the network 110 and/or the devices 130, 140, 141, 150 connected to the network through or using Ethernet AVB protocols such as IEEE 802.1AS-2011 (gPTP), IEEE 802.1Qav-2009, IEEE 802.1Qat-2010 (SRP), and/or IEEE 1722-2011. The bridges 160, 161 may communicate using other protocols.

As previously described, a stream advertisement may include the propagation delay from the talker 130 to one of the listeners 140, 141. The talker 130 may be configured to initially set the propagation delay field in the stream advertisement to a value that is indicative of or otherwise takes into account a delay between the talker 130 and a first bridge 160 in a path between the talker 130 and one of the listeners 140, 141. The first bridge 160 may be configured to receive the stream advertisement from the talker 130. When the first bridge 160 receives the stream advertisement, the first bridge 160 may be configured to calculate the time (i.e., latency) that it takes for the first bridge 160 to pass the stream advertisement down the path toward the listener 140 (e.g., the path 172) or the path toward the listener 141 (e.g., the path 174). For example, the first bridge 160 may be configured to calculate the latency from an ingress port of the first bridge 160 to an egress port of the first bridge 160. The first bridge 160 may also be configured to update the propagation delay with the calculated latency and/or modify the propagation delay field in the stream advertisement in accordance with the calculated latency. The propagation delay may be referred to as an accumulated latency because the propagation delay accumulates as the data stream passes through each bridge in the network 110 between the talker 130 and one of the listeners 140, 141. The first bridge 160 may be further configured to send the stream advertisement down the path toward the listener 140 (e.g., the path 172) or the path toward the listener 141 (e.g, the path 174) after updating the propagation delay.

In the example communication system 100 shown in FIG. 1, where the bridge 160 sends the stream advertisement toward the listener 141, a path between the talker 130 and the listener 141 (e.g., a path that includes the path 170 and the path 174) does not include any further bridges, and the stream advertisement may be sent directly to the listener 141. Alternatively, where the bridge 160 sends the stream advertisement toward the listener 140, the stream advertisement may pass through a second bridge 161 before reaching the listener 140. The second bridge 161 may be configured to receive the data stream and calculate a latency or time delay that is taken for the second bridge 161 to pass the stream advertisement down toward the listener 140 (e.g., down the path 176). The second bridge 161 may also be configured to update the propagation delay and/or modify the propagation delay field in the stream advertisement in accordance with the calculated latency. The second bridge 161 may be further configured to send the stream advertisement down the path toward the listener 140 (e.g., the path 176) after updating the propagation delay. In some network communication systems, such as the network communication system 100 shown in FIG. 1, the propagation delay between the talker 130 and the listener 140 may be different than the propagation delay between the talker 130 and the listener 141 because, for example, the data stream passes through a different number of bridges (or undergoes a different number of bridge hops). The more bridges that the data stream passes through, the greater the latency there may be between the talker 130 and the one of the listeners 140, 141.

As previously described, after one or more of the listeners 140, 141 receives the stream advertisement, the one or more of the listeners 140, 141 may respond by sending a response message, such as a LR or a LAF message over the network 110 and back to the talker 130. The talker 130 may be configured to receive the response message and establish a connection or data path between the talker 130 and one or more of the listeners 140, 141 to send the data stream. The data stream, or one or more packets of data comprising the data stream, may include a presentation time. The presentation time may be a time that one or more of the listeners 140, 141 presents the received data to their respective physical media interfaces. The physical media interfaces may be configured to output the data in a final format, such as an audio or video format that can be heard or seen by a person. The presentation time may be indicative of a time far enough in the future so that all of the listeners 140, 141 may present the data to their respective physical media interfaces at the same time or simultaneously, regardless of the different propagation delays between the talker 130 and the listeners 140, 141. The talker 130 may be configured to calculate or determine the presentation time and/or insert the presentation time in the data stream. The presentation time may include a current network time, as set by the Precision Time Protocol, IEEE 802.1AS-2011 (gPTP). The presentation time may also include an offset added to the current network time that may compensate for any network latency, such as the propagation delay, through the network 110. In some example network communication systems, the offset may be added to the current network time whenever a timestamp is taken of an outgoing sample of the data stream. A sample may be an individual element of the data, such as a pixel, or an individual element of audio data, which may have been sampled at a predetermined sample rate, such as 48 kHz.

The offset included in the presentation time may be, indicative of, dependent upon, and/or based on a maximum latency, including a maximum propagation delay, between the talker 130 and the listeners 140, 141. In the example network communication system 100, the propagation delay between the talker 130 and the listener 140 may be greater than the propagation delay between the talker 130 and the listener 141 because the path between the talker 130 and the listener 140 (including the path 170, the path 172, and the path 176) includes more bridges (e.g., the second bridge 161) than the path between the talker 130 and the listener 141 (including the path 170 and the path 174). As such, the offset may be determined to be, indicative of, and/or based on the propagation delay between the talker 130 and the listener 140, rather than propagation delay between the talker 130 and the listener 141. If the offset is determined to be, indicative of, and/or based on the propagation delay between the talker 130 and the listener 141, rather than the propagation delay between the talker 130 and the listener 140 (i.e., the shorter of the propagation delays or the propagation delay that is not the maximum propagation delay), then the listeners 140, 141 may not present the data stream simultaneously or at the same network time. In that case, if the presentation time is based on a non-maximum propagation delay, the presentation time may cause and/or provide an instruction to present the data stream at a network time that is before all of the listeners 140, 141 may receive the data stream. The maximum propagation delay may be and/or indicate an earliest presentation time that the listeners 140, 141 may present the data stream to their respective media interfaces simultaneously. The earliest presentation time may be determined by a minimum offset that may be applied to the current network time. In the network communication system 100, the maximum propagation delay is the maximum propagation delay among the listeners 140, 141. In other network communication systems, there may be only one listener, and the maximum propagation delay is the propagation delay between the talker and the only one listener. The maximum latency determined by the controller may be a dynamic value that may change as listeners enter and/or leave the communication system 100, as paths in the network connecting the talker 130 and the listeners 140, 141 and/or other listeners are established or removed, and/or as bridges in the network are added to and/or removed from the paths. The dynamic maximum latency may be used to generate a dynamic offset and/or an optimum presentation time as the number of listeners in the system, the paths connecting the talker and the listeners, and the bridges in the network change.

In other example network communication systems, the offset may be a predetermined and/or fixed value that is not indicative of, dependent upon, or based on the propagation delay (e.g., a dynamic propagation delay) between a talker and a listener. In addition or alternatively, the predetermined and/or fixed offset may determine a presentation time that is not the earliest time that the listeners 140, 141 may present the data stream simultaneously. The predetermined and/or fixed offset may determine a presentation time that that is too far in the future than is necessary for the listeners 140, 141 to present the data stream simultaneously. For example, in a network communication system designated as a Stream Reservation (SR) Class A (hereinafter "Class A") network communication system, the predetermined value may be 2 milliseconds. The 2 milliseconds may be a value that is predetermined to be greater than any delay or latency between a talker and a listener in a Class A network communication system. Similarly, in a network communication system designated as a Class B network communication system, the predetermined value may be 50 milliseconds. The 50 milliseconds may be a value that is predetermined to be greater than any delay or latency between a talker and a listener in a SR Class B (hereinafter "Class B") network communication system. In those network communication systems, the offset is set at 2 milliseconds or 50 milliseconds regardless of an actual maximum time delay between the talker and the listeners, as may be determined by the accumulated propagation delay of the stream advertisement. However, in network communication systems, including those designated as Class A and Class B systems, the maximum time delay as determined by the accumulated propagation delay of the stream advertisement may be less than the predetermined fixed offsets (e.g., the 2 milliseconds or 50 milliseconds values). Where the actual maximum propagation delay is less than the predetermined and/or fixed values (e.g., 2 milliseconds or 50 milliseconds), the data included in the data stream may be presented by the listeners to their respective physical media interfaces at a presentation time that is later in time (i.e., further into the future) than is necessary for all of the listeners to present the data while still accounting for the latency between the talker and all of the presenting listeners. By determining an offset to the presentation time that is, indicative of, or based on an actual maximum latency between the talker and the listeners in the system, rather than by setting an offset to a predetermined and/or fixed value, the performance of the system may be improved or enhanced, particularly for systems where time delays in the milliseconds or less is significant, such as audio and/or video systems used in live music performances.

In the network communication system 100 shown in FIG. 1, the talker may be configured to determine an offset of the presentation delay that is, indicative of, and/or based on a maximum latency or delay between the talker 130 and the listeners 140, 141. In one example, the maximum latency may be the maximum latency amongst only those listeners 140, 141 that may wish and/or are able to receive the data stream. For example, if both the listener 140 and the listener 141 send LR messages back to the talker 130 after receiving the stream advertisement, then the maximum latency may be the maximum latency amongst both the latency between the talker 130 and the listener 140 and the latency between the talker 130 and the listener 141. Alternatively, if only one of the listener 140 and the listener 141 is able to receive the data stream (e.g., the talker 130 receives a LRF message), then the maximum latency will be the latency delay between the talker 130 and the one of the listener 140 or the listener 141 that is able to receive the data stream. In an alternative example, the maximum latency may be the maximum latency amongst all of the listeners receiving the stream advertisement regardless of whether the listeners 140, 141 wish to or are able to receive the data stream. Similar maximum latencies may be determined in network communication systems having more or fewer listeners than the listeners 140, 141.

The talker 130 may determine the maximum latencies by receiving one or more messages indicative of the maximum latency and/or indicative of the latencies of the listeners 140, 141 from the controller 150. The controller 150 may be configured to determine the maximum latency and/or generate the one or more messages indicative of the maximum latency or the latencies of the listeners 140, 141 by receiving information regarding the latencies from the listeners 140, 141. In one example, after the listeners 140, 141 receive respective stream advertisements that include the stream ID and the respective accumulated propagation delays, the listeners 140, 141 may be configured to record and/or store the respective accumulated propagation delays for the stream ID. The accumulated propagation delay between the talker 130 and one of the listeners 140, 141 may be indicative of a latency from the talker 130 to the ingress port of the one of the listeners 140, 141, but may not include any latency from the physical media interfaces of the one of the listeners 140, 141 to one or more media buffers of the one of the listeners 140, 141. Each of the listeners 140, 141 may be configured to determine a total latency, which may include the recorded and/or stored accumulated propagation delays in addition to latency associated with the delay between the physical media interface and the media buffer of the listener 140, 141. Additionally, each of the listeners 140, 141 may be configured to generate a listener latency message that includes information indicative of the total latency between the talker 130 and one of the listeners 140, 141. Each of the listeners 140, 141 may be further configured to send the listener latency message packet to the controller 150. The listeners 140, 141 may be configured to send, and the controller 150 may be configured to receive, the listener latency messages from over the network 110. Alternatively, wired or wireless non-network connections between one or more of the listeners 140, 141 and the controller 150, as denoted by dotted arrows 180 and 182, may be used to communicate the listener latency messages between one or more of the listeners 140, 141 and the controller 150.

In one example configuration, the listeners 140, 141 may be configured to automatically send their respective listener latency messages after and/or in response to receiving the stream advertisements from the talker 130. The listeners 140, 141 may be configured to automatically send the listener latency messages where the listeners 140, 141 know the controller 150 and/or one or more characteristics of the controller 150, such as an Internet Protocol (IP) address of the controller 150, before the listeners 140, 141 generate and/or send the listener latency messages. The listeners 140, 141 may be configured to know the controller 150 and/or one or more characteristics of the controller 150 during an initial setup of the system 100.

In an alternative example configuration, the listeners 140, 141 may be configured to generate and/or send the listener latency messages after and/or in response to receiving a latency information request from the controller 150. The listeners 140, 141 may be configured to generate and/or send the listener latency messages after receiving the latency information request from the controller 150 where the listeners 140, 141 do not know the controller 150 and/or one or more of the characteristics of the controller 150 prior to receiving the latency information request. In the alternative example configuration, in response to receiving stream advertisements, the listeners 140, 141 may be configured to record and/or store the propagation delays, but may not also be configured to automatically generate the listener latency messages. Rather, only after receiving the latency information request from the controller 150 may the listeners 140, 141 be configured to generate and/or send the listener latency messages to the controller 150. The latency information request may be a unicast message that is sent from the controller 150 directly to one of the listeners 140, 141. Multiple unicast latency information requests may be sent directly to the listeners 140, 141, e.g., a first latency information request to the listener 140 and a second latency information request to the listener 141. Alternatively, the latency information request may be a broadcast or a multicast message that is sent to all of the listeners 140, 141, or all of the devices, including the talker 130 in addition to the listeners 140, 141, in the network communication system 100. The latency information request sent by the controller 150 may include the stream ID of the reserved stream. By including the stream ID, any devices in the system 100 not listening to the data stream may ignore the latency information request.

In response to receiving listener latency messages from the listeners 140, 141, the controller 150 may determine and/or calculate the maximum latency for a stream ID between the talker 130 and the listeners 140, 141. In one example, the maximum latency may be a maximum of the total latency between the talker 130 and the listener 140 and the total latency between the talker 130 and the listener 141. Alternatively, the maximum latency may be a maximum of the propagation delay between the talker 130 and the listener 140 and the propagation delay between the talker 130 and the listener 141, but does not take into consideration any latencies between the physical media interfaces and the media buffers of the listeners 140, 141. In addition, the maximum latency may include a "measurement error correction factor" that is indicative of any other delays or errors causing delays in one or more transmission paths between the talker 130 and one or more of the listeners 140, 141. For example, if a miscalculation of latency by one or more of the bridges 160, 161 and/or more of the listeners 140, 141 is identified, a measurement error correction may be determined and/or included in the maximum latency calculation to account for the miscalculation.

The controller 150 may also be configured to store the latency information included in the listener latency messages and/or the maximum latency determined from the latency information in memory. The controller 150 may further be configured to access the stored latency information and/or the maximum latency when performing subsequent latency determinations and/or calculations, as described in further detail below with respect to FIG. 2.

After the controller 150 determines the maximum latency for the stream ID, the controller 150 may generate and/or send a stream latency message that includes the stream ID and the maximum latency for the stream ID. The controller 150 may be configured to send the stream latency message to the talker 130 and/or one or more of the listeners 140, 141. The controller 150 may be configured to send the stream latency message over the network 110. Alternatively, one or more as wired or wireless non-network connections between the controller 150 and one or more of the talker 130, the listener, 140 and/or the listener 141, as denoted by dotted paths 180, 182, 184, may be established to send the stream latency message to the talker 130, the listener 140, and/or the listener 141.

In response to receiving the stream latency message, the talker 130 may be configured to generate an offset value for the presentation time that is based on the maximum latency. In one example, the offset is added to the current network time whenever a timestamp is taken of an outgoing data sample, and indicates the time at which the sample should be presented (e.g., played) by the listener 140, 141. By generating an offset based on the maximum latency between the talker 130 and the listeners 140, 141, rather than by using a predetermined value (e.g., 2 milliseconds or 50 milliseconds for Class A and Class B systems, respectively), the offset added to the current network time may be minimized and as a result, optimized.

Also, by determining a maximum latency, resources (e.g., memory) of the system 100 that are used to store or buffer the data may be allocated more efficiently. For example, one or more of the listeners 140, 141 may be configured to buffer the received data stream using buffer memory included in the listeners 140, 141 before the data stream is presented to the physical media interface of the listeners 140, 141. The amount of buffer memory that is allocated for the buffering may correspond to the amount of latency or the amount of time that the listeners 140, 141 may wait before presenting the data to their respective physical media interfaces. The longer that the listeners 140, 141 have to wait before presenting the data, the more memory that the listeners 140, 141 may have to allocate. By minimizing the amount of time and/or eliminating unnecessary time that the listeners 140, 141 may wait before presenting the data, fewer resources (e.g., buffer memory) may be allocated.

In response to receiving the stream latency message from the controller 150, the listeners 140, 141 may use the maximum latency included in the stream latency message to allocate the buffer memory in various ways. In one way, the buffer memory may be allocated on a per stream basis. The maximum latency given in the stream latency message may be used by the listener 140, 141 to determine a minimum amount of memory that may be used to buffer the data stream before the data stream is presented. In another way, the buffer memory may be allocated on a system-wide or on a physical media interface basis, where streams associated with more than one stream ID may be stored in a given buffer. In this way, a current buffer size may be determined for a maximum latency associated with a current data stream. If a next or a new data stream is received and to be stored in the buffer, a comparison may be made using the current buffer size and a new buffer size that is based on a maximum latency associated with the next or the new data stream. The comparison may determine whether more memory may be allocated to accommodate both the current data stream and the next or new data stream. The system 100 may be configured to generate an error condition if more memory is needed but is not able to be allocated. In another way, the buffer memory may be allocated based on one or more predetermined and/or fixed values (e.g., the 2 milliseconds or 50 milliseconds values specified in Class A and Class B systems). In this way, the buffer memory is not allocated using the maximum latency indicated in the stream latency message, but may be used to adjust watermark pointers in the buffer memory. If the watermark pointers are exceeded, one or more error conditions may be generated.

Figure 2:
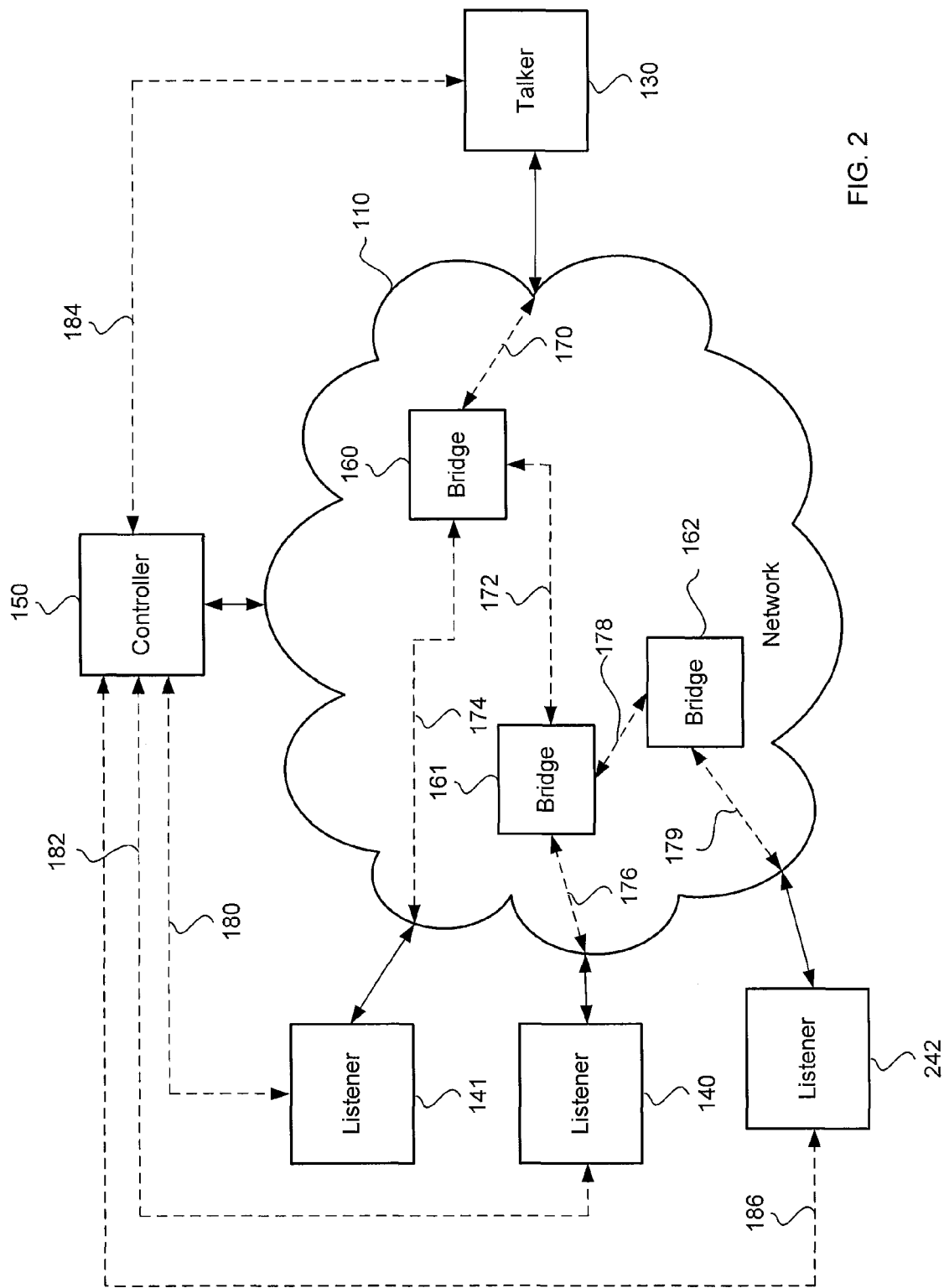
FIG. 2 is a block diagram of an example network communication system showing an additional listener having entered the system.

FIG. 2 illustrates the example network communication system 100, where the system 100 further includes a listener 242 that has been added to, entered, and/or connected to the system 100, including the network 110, after a maximum latency has been determined between the talker 130 and the listeners 140, 141. Where the listener 242 enters the system 100, a path between the talker 130 and the listener 242 may be established, and latency in the path may be introduced into the system 100. As an example, FIG. 2 shows a path in the network 110 connecting the talker 130 and the listener 242, which includes the path 170 connecting the talker 130 with the first bridge 160, the path 172 connecting the first bridge 160 and the second bridge 161, a path 178 connecting the second bridge 161 with a third bridge 162, and a path 179 connecting the third bridge 162 and the listener 242. In the example network configuration shown in FIG. 2, the third bridge 162 may be configured to receive a stream advertisement from the second bridge 161 that includes an accumulated propagation delay. The third bridge may further be configured to determine a delay between ingress and egress ports of the third bridge 162. The third bridge 162 may be configured to change and/or update the accumulated propagation delay based on the determined delay between its ingress and egress ports. The third bridge 162 may further be configured to pass the stream advertisement with the updated accumulated propagation delay to the listener 242. Because the path between the talker 130 and the listener 242 includes an extra bridge (i.e., the bridge 162), the propagation delay between the talker 130 and the listener 242 may be greater than either of the propagation delays between the talker 130 and the listener 140 and/or the listener 141. In alternative network configurations, other paths connecting the talker 130 and the listener 242 using the bridges 160, 161, 162 alone or in various combinations, or using other bridges not shown in FIG. 2, which may be included in the network 110 and alone or in combination with one or more of the bridges 160, 161, 162, may be established and/or torn down to connect or disconnect the talker 130 and the listener 242. Various other propagation delays between the talker 130 and the listener 242 associated with the other possible paths may be determined. The various other propagation delays between the talker 130 and the listener 242 may be less than, greater than, equal to, or substantially equal to the propagation delays between the talker 130 and one or more of the listeners 140, 141 depending on the path configurations.

Where the new listener, i.e., the listener 242, enters the system 100, the system 100 may be configured to determine whether to re-optimize the system 100 based on the listener 242 entering the system 100. The determination to re-optimize may be based on determining that the maximum latency for the new set of listeners, i.e., the listeners 140, 141, 242, has changed. For example the determination to re-optimize may be based on determining that the maximum latency for the new set of listeners is greater than the maximum latency for the original or first set of listeners. The determination of whether to re-optimize may be made after a stream reservation is established between the talker 130 and the listener 242. In one example, the listener 242 may be configured to automatically send a listener latency message that includes latency information between the talker 130 and the listener 242 to the controller 150 after the stream reservation is established, as previously described. Alternatively, the listener 242 may be configured to send the listener latency message to the controller only after receiving a latency information request from the controller 150, as previously described.

In response to receiving the listener latency message from the listener 242, the controller 150 may be configured to determine whether the maximum latency of the new set of listeners 140, 141, 242 is greater than the maximum latency for the original set of listeners 140, 141. The controller 150 may be configured to compare the latency information included in the listener latency message with the maximum latency that was previously determined between the talker 130 and the listeners 140, 141 before the listener 242 connected to the system 100. The controller 150 may be configured to access the maximum latency from memory to perform the comparison. The controller 150 may further be configured to determine whether to modify, change, or update the maximum latency. If the latency between the talker 130 and the listener 242 is greater than the maximum latency, then the controller 150 may be configured to change the maximum latency to the latency between talker 130 and the listener 242. Alternatively, if the latency between the talker 130 and the listener 242 is less than or equal to the maximum latency, then the controller 150 may be configured to leave the maximum latency value unchanged.

Once transmission of the data stream has started, the offset portion of the presentation time included in the data stream may not be changed or modified. Where the data stream is being transmitted from the talker 130 to one or more of the listeners 140, 141 and where the listener 242 thereafter enters the system 100, if the latency between the talker 130 and the listener 242 is less than the maximum latency currently set for the system 100, then the current maximum latency may remain unchanged, and the listener 242 may receive the data stream having the presentation determined for the current maximum latency. Alternatively, if the latency between the talker 130 and the listener 242 is greater than the maximum latency and the maximum latency is changed, then the system 100 may be reconfigured for the changed or new maximum latency. In one example reconfiguration, the system 100 may be reconfigured by removing or destroying the stream reservation and/or the connection between the talker 130 and the listeners 140, 141, and communication of the data stream from the talker 130 to one or more of the listeners 140, 141 may be stopped. Thereafter, new reservations between the talker 130 and the listeners 140, 141, 242 may be established, and a data stream having a new presentation time corresponding to the changed or new maximum latency may be transmitted from the talker 130 to the listeners 140, 141, 242. In one example, the controller 150 may send instructions to the talker 130 and/or one or more of the listeners 140, 141, 242 to destroy their respective stream reservations and stop transmitting the data stream. The one or more instructions may also include the new maximum latency, and may instruct the talker 130 to generate a presentation time using the new maximum latency. The one or more instructions may also instruct the talker 130 and the listeners 140, 141, 242 to establish stream reservations, and for the talker to send the data stream having the new data stream to the listeners 140, 141, 242. In response to receiving the instructions, the talker 130 and/or one or more of the listeners 140, 141, 242 may communicate with each other to remove their respective stream reservations and stop communication of the data stream. Subsequently, a new reservation may be made between the talker 130 and the listeners 140, 141, 242 and the talker 130 may transmit the data stream over one or more paths established by the new reservation to the listeners 140, 141, 242. The data stream may be the same data stream or an identical or substantially identical data stream as the data stream that was being transmitted to the listeners 140, 141 before the listener 242 connected to the system 100. In a second example configuration where the latency between the talker 130 and the listener 242 is greater than the maximum latency, a second or new data stream may be created or generated that comprises the same data as the data stream being transmitted to the listeners 140, 141. The new data stream may only be sent to the listener 242 (i.e., the newly entered listener). One potential downfall to the second example configuration is that synchronization problems between the listeners 140, 141 and 242 may be present.

Although the above description with respect to FIG. 2 describes only one listener, i.e., the listener 242, being added to, entering, and/or being connected to the system 100, more than one listener may be added, enter, and/or connect to the system 100. In addition, more than one listener may be added to, enter, and/or connect to the system 100 at any time, including at the same time or substantially the same time, or at different times. The system 100 may perform identical or similar actions as those described above when the listener 242 is added to the system 100 to determine whether to change and/or update the maximum latency and/or send the data stream or a new data stream with the updated and/or changed maximum latency. For example, if a fourth listener is added to the system 100 at the same time or substantially the same time as the listener 242, then the fourth listener may also be configured to send a listener latency message to the controller 150, and the controller 150 may be configured to determine whether to change the maximum latency based on the latency information received from either the listener 242 or the fourth listener. If either or both of the latencies between the talker 130 and the listener 242 or between the talker 130 and the fourth listener is greater than the maximum latency, then the controller 150 may be configured to change the maximum to whichever of the latencies between the talker 130 and the listener 242 or the fourth listener is the greatest. The controller 150 may be configured to determine whether to change the maximum latency and/or to which latency value for any number of listeners entering the system 100. As another example, if the fourth listener enters the system 100 at a time subsequent to a time that the listener 242 enters the system 100, the controller 150 may be configured to determine whether to change the maximum latency a second time, the first time being when the listener 242 entered the system 100. The controller 150 may be configured to determine whether to set and/or change the maximum latency any amount of times for any number of listeners entering the system 100 at different times.

In addition or alternatively, the system 100, including the controller 150, may be configured to determine whether to change the current maximum latency and/or set a new maximum latency after one or more listeners leave and/or disconnect from the system 100. Where the new maximum latency for the remaining listeners is less than the current maximum latency, the controller 150 may be configured to change the current maximum latency to the new maximum latency. As an example, where the listener 242 disconnects from the system 100, the controller 150 may be configured to determine a new maximum latency between the talker 130 and the remaining listeners (i.e., the listeners 140, 141). The controller 150 may further be configured to determine whether the new maximum latency is less than the current maximum latency. If the new maximum latency is not less than the current maximum latency, then the controller 150 may determine not to change the current maximum latency, and the talker 130 may continue to transmit that data stream to the listeners 140, 141 at the presentation time corresponding to the current maximum latency. Alternatively, if the new maximum latency is less than the current maximum latency, then the controller 150 may be configured to send instructions to the talker 130 and/or the listeners 140, 141 to remove their stream reservations and stop the transmission of the data stream. The controller 150 may further send the new maximum latency information to the talker 130 and/or the listeners 140, 141. Based on receiving the new maximum latency information, the talker 130 may be configured to generate a new presentation time and include the new presentation time in the data stream and transmit the data to the listeners 140, 141. The controller may be configured to determine whether to change and/or set the maximum latency for any number of listeners leaving and/or disconnecting from the system 100 and/or at any number of different times.

Figure 3:
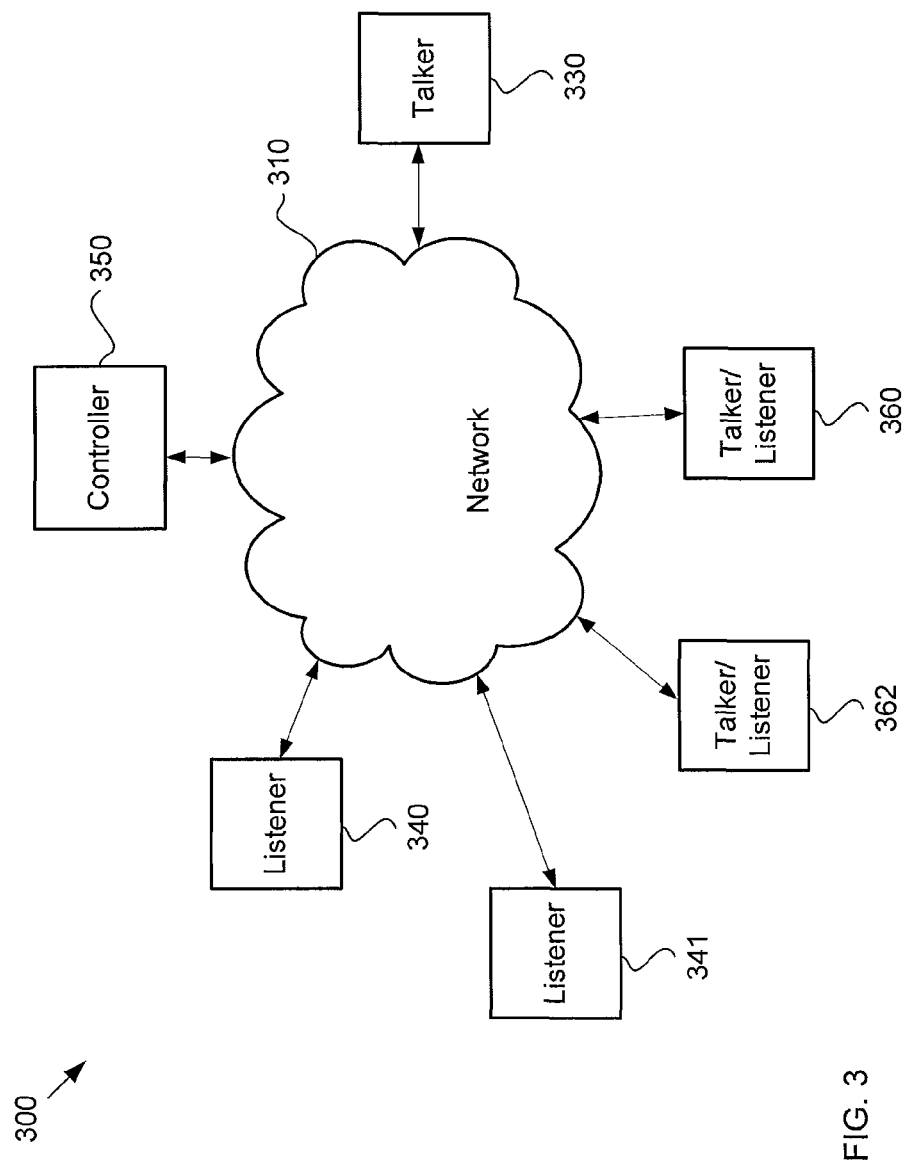
FIG. 3 is a block diagram of another example network communication system, including devices in between a talker and a plurality of listeners.

FIG. 3 illustrates an alternative example network communication system 300 that may determine an overall maximum latency where a data stream may be passed through and/or be processed by one or more electronic devices before being finally received and/or presented by one or more listeners. The example system 300 may include a plurality of electronic devices that are configured to perform the roles of a talker, a listener, and a talker/listener. The role of the talker/listener may be to perform both the role of the talker and the listener, either at the same time or at different times. The example system 300 may include a talker 330, one or more listeners 340, 341, a controller 350, and one or more talker/listeners 360, 362 in communication with a network 310. The talker/listeners 360, 362 may be configured to both transmit and receive one or more data streams. The talker 330 may be configured to transmit a data stream to one or more of the talker/listeners 360, 362 and/or directly one or more of the listeners 340, 341 without first sending the data stream to one or more of the talker/listeners 360, 362. The talker/listeners 360, 362 may be configured to receive the data stream from the talker 330. In addition or alternatively, the talker/listeners 360, 362 may be configured to transmit and/or receive the same, a modified, and/or a different data stream from the data stream received from the talker 330 to and/or from each other, and/or to one or more of the listeners 340, 341.

One or more stream advertisements may be sent from the talker 330 and/or one or more of the talker/listeners 360, 362 and listener responses, such as listener ready messages, may be sent from the listeners 340, 341 and/or one or more of the talker/listeners 360, 362 to establish stream reservations between the talker 330, the talker/listeners 360, 362, and the listeners 340, 341. The one or more stream advertisements may include one or more accumulated propagation delay fields indicating accumulated propagation delay between two or more of the talker 330, the talker/listeners 360, 362, and/or the listeners 340, 341. The talker/listeners 360, 362 and the listeners 340, 341 may be configured to send listener latency messages indicating latency information to the controller 350. As an example, the talker 330 may send a stream advertisement to the talker/listener 360, and in response the talker/listener 360 may send a listener latency message to the controller 350, which may indicate latency information between the talker 330 and the talker/listener 360. Similarly, the talker/listener 360 may send a stream advertisement to the talker/listener 362, and in response, the talker/listener 362 may send a listener latency message to the controller 350, which may indicate latency information between the talker/listener 360 and the talker/listener 362. As another example, the listener 340 may send a listener latency message to the controller 350, which may indicate latency information between the talker/listener 362 and the listener 340. Other listener latency messages indicating other latency information between two or more of the talker 330, the talker/listeners 360, 362, and/or the listeners 340, 341 may be sent.

The controller 350 may be configured to receive the listener latency messages from the talker/listeners 360, 362 and/or the listeners 340, 341 and determine one or more maximum latencies. In one example, the one or more maximum latencies comprises an overall maximum latency of the system 300. The overall maximum latency may be the greater of the two latencies between the talker 330 and the listener 340 and between the talker 330 and the listener 341, which may include latency information associated with the talker/listeners 360, 362, such as between the talker 330 and one or more of the talker/listeners 360, 362, between the talker/listeners 360, 362, and/or between one or more of the talker/listeners 360, 362 and one or more of the listeners 340, 341.

To illustrate, the example network communication system 300 may be an audio system, where the talker 330 may be a microphone, the talker listener 360 may be a mixer, the talker/listener 362 may be a loudspeaker controller, and the listeners 340, 341 may be loudspeaker amplifiers. The microphone 330 may send an audio stream to the mixer 360. The mixer 360 may output a mixed or otherwise modified audio stream to the loudspeaker controller 362. The loudspeaker controller 362 may output the audio stream to the loudspeaker amplifiers 340, 341, where amplified audio signals may be finally output through speakers. The mixer 360, the loudspeaker 362, and the loudspeaker amplifiers 340, 341 may each send listener latency messages to the controller 350. The listener latency message sent by the mixer 360 may be include latency information between the microphone 330 and the mixer 360. The listener latency message sent by the loudspeaker controller 362 may include latency information between the mixer 360 and the loudspeaker controller 362. The listener latency message sent by the loudspeaker amplifier 340 may include latency information between the loudspeaker controller 362 and the loudspeaker amplifier 340. The listener latency message sent by the loudspeaker amplifier 341 may include latency information between the loudspeaker controller 362 and the loudspeaker amplifier 341.

The controller 350 may be configured to determine an overall maximum latency based on the latency information included in the listener latency messages. To determine the overall maximum latency, the controller 350 may be configured to determine a total latency between the microphone 330 and the loudspeaker amplifier 340 and a total latency between the microphone 330 and the loudspeaker amplifier 341. The total latency between the microphone 330 and the loudspeaker amplifier 340 may include propagation delay between the microphone 330 and the mixer 360, propagation delay between the mixer 360 and the loudspeaker controller 362, and propagation delay between the loudspeaker controller 362 and the loudspeaker amplifier 340. Similarly, the total latency between the microphone 330 and the loudspeaker 341 may include propagation delay between the microphone 330 and the mixer 360, propagation delay between the mixer 360 and the loudspeaker controller 362, and propagation delay between the loudspeaker controller 362 and the loudspeaker amplifier 341. Also, as previously described, total latencies may include delays between any physical media interfaces and media buffers included in one or more of the mixer 360, the loudspeaker controller 362, and/or one or more of the loudspeaker amplifiers 340, 341. The controller 350 may further be configured to compare the total latencies associated with the loudspeaker amplifiers 340, 341 and determine which of the total latencies is greatest. The controller 350 may set an overall maximum latency to the greatest total latency associated with one of the listeners 340, 341.

The total latencies between the talker 330 and the listeners 340, 341 may have common propagation delays. Using the example above to illustrate, the total latency for the loudspeaker amplifier 340 and the total latency for the loudspeaker 341 may both include the propagation delay between the microphone 330 and the mixer 360 and the propagation delay between the mixer 360 and the loudspeaker controller 362. Although the common propagation delays may cancel each other out during the comparison to determine which total latency is the greatest, the common propagation may still be factored into the maximum latency and/or included in the maximum latency information sent in the stream latency messages to the talker 330, the talker/listeners 360, 362, and/or the listeners 340, 341. As previously discussed, in some network communication systems, a predetermined and/or fixed value (e.g., 2 milliseconds or 50 milliseconds) is set as the offset to the current network time. The predetermined and/or fixed value is used for each communication between two of the talker 330, the talker/listener 360, 362, and/or the listeners 340, 341. To illustrate, using the example described above, where the communication system 300 is designated as a Class A system, the offset component of the presentation time may be 6 milliseconds-2 milliseconds for the latency between the talker 330 and the mixer 360, 2 milliseconds for the latency between the mixer 360 and the loudspeaker controller 362, and 2 milliseconds for the latency between the loudspeaker controller and either of the loudspeaker amplifiers 340, 341. If, for example, any of the actual latencies between the microphone 330 and the mixer 360, between the mixer 360 and the loudspeaker controller 362, between the loudspeaker controller 362 and the loudspeaker amplifier 340, or between the loudspeaker controller 362 and the loudspeaker amplifier 341 are less than 2 milliseconds, then by factoring the actual latencies, rather than the predetermined and/or fixed values, into the overall maximum latency determination, an offset and resulting presentation time included in the data streams may be decreased and/or minimized, which may optimize the performance of the system 300, as previously described.

Figure 4:
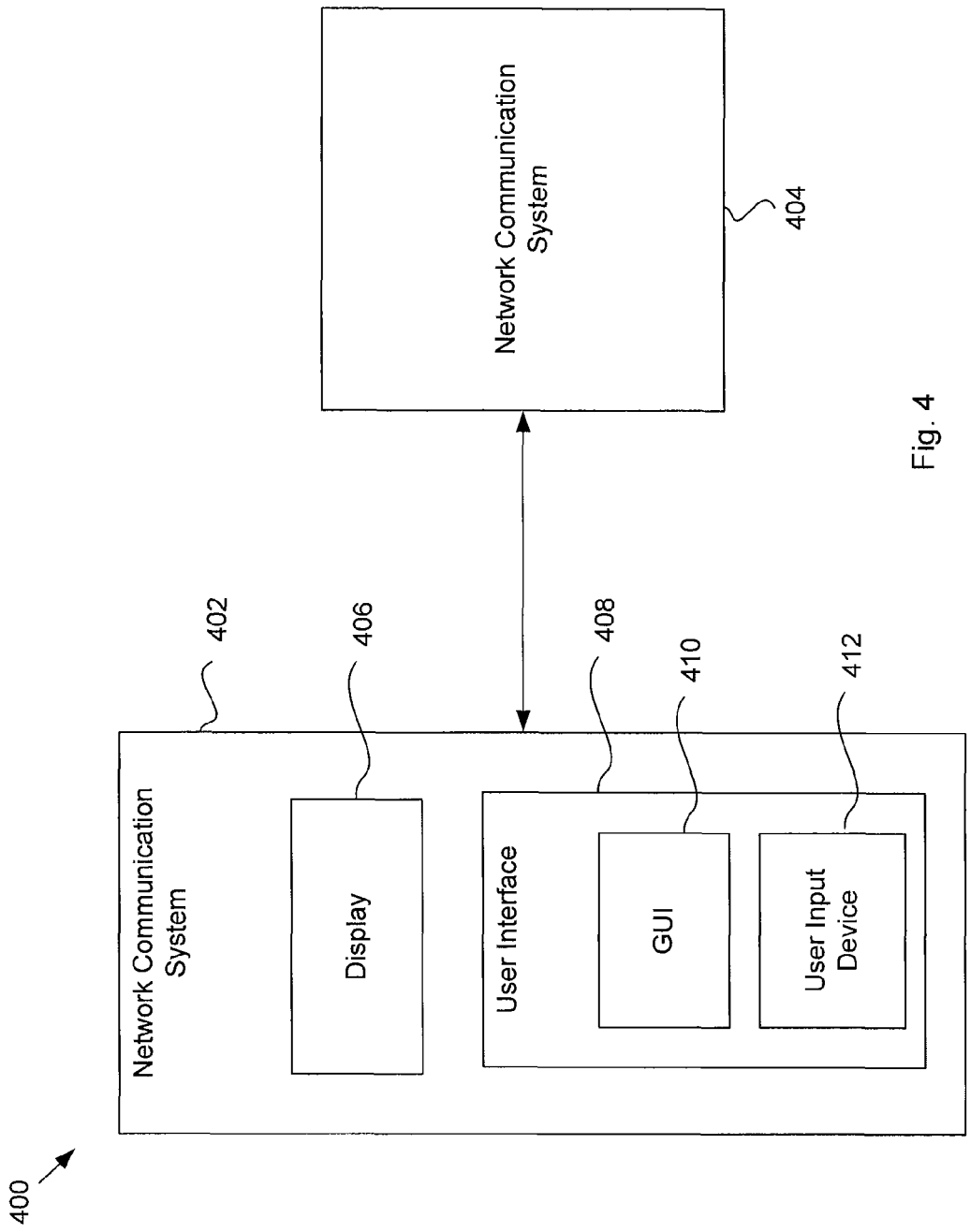
FIG. 4 is a block diagram of an example latency monitoring and optimization system.

FIG. 4 illustrates an example latency monitoring and optimization system 400. The latency monitoring and optimization system 400 may include a computer system 402 in communication with a network communication system 404. The network communication system 404 may include the network communication system 100 shown in FIGS. 1 and/or 2, the network communication system 300 shown in FIG. 3, one or more combinations thereof, and/or more or fewer talkers, talker/listeners, listeners, and/or controllers than those shown in and described with reference to FIGS. 1, 2, and/or 3. One or more paths may connect devices in the system 404, including the one or more talkers, the one or more talker/listeners, the one or more listeners, and/or the one or more controllers to send and/or receive data streams, advertisement stream messages, listener latency messages, latency requests, and/or stream latency messages over a network and/or through non-network connections, as previously described. One or more bridges may be configured along the paths to route message toward a destination endpoint.

The computer system 402 may include a portion or all of the features of the computer 700 shown in FIG. 7, as described in more detail below. The computer system 402 may be configured to monitor the network communication system 404 to determine latency information and/or changes in latency information for one or more of the paths between the devices in the system 404, the paths between the devices and the bridges, and/or the paths between the bridges. The computer system 402 may be configured to determine maximum latencies for one or more stream IDs and minimize the offsets and/or presentation times included in one or more data streams. The computer system 402 may include a display 406 that displays, such as by providing a graphical representation of, the latencies associated with the different paths. By viewing the display 406, a user of the computer system 402 may survey the paths in the network communication system 404 and identify and/or locate the different delays in the network communication system 404. In addition or alternatively, the computer system 402 may include a user interface 408 that may configured to receive one or more inputs from the user of the computer system 402. The user interface 408 may be hardware based, software based, or a combination thereof. For example, the user interface 408 may include a graphical user interface (GUI) 410 that may set one or more parameters, for example offset or presentation time, for one or more streams associated with one or more paths in the network communication system 404 and/or associated with one or more stream IDs. The GUI 410 may be displayed on the display 406. The user interface 408 may also include a user input device 412 in communication with the GUI 410 that the user may operate to provide one or more inputs to the GUI 410. The GUI 410 may be configured to receive the user inputs and set the parameters based on the received user inputs. Through the user interface, the user may optimize the system for a minimal amount of latency by setting offsets and/or presentation times for various paths in the network communication system 404 based on the latency information provided by the computer system 402.

Referring back to FIGS. 1-3, one or more of the talkers 130, 330 the listeners 140, 141, 242, 340, 341, talker/listeners 360, 362, and/or the controllers 150, 350 may be or may include hardware, software, and/or a combination of hardware and software to implement part or all of the functionality of the systems 100, 300. One or more of the talker talkers 130, 330 the listeners 140, 141, 242, 340, 341, talker/listeners 360, 362, and/or the controllers 150, 350 may be or may include one or more processors, such as one or more central processing unit (CPU), and/or may be in communication with one or more processors, such as a processor of an integrated circuit (e.g., a field programmable gate array (FPGA) or an application specific integrated circuit (ASIC)). More or fewer components may be included in other examples.

One or more of the talkers 130, 330 the listeners 140, 141, 242, 340, 341, the talker/listeners 360, 362, and/or the controllers 150, 350 may be connected to each other through or using the networks 110, 310. Alternatively or additionally, one or more of the talkers 130, 330 the listeners 140, 141, 242, 340, 341, the talker/listeners 360, 362, and/or the controllers 150, 350 may be connected to each other directly. For example, one or more of the talkers 130, 330 the listeners 140, 141, 242, 340, 341, the talker/listeners 360, 362, and/or the controllers 150, 350 may be connected to each other using a wireline such as an Ethernet cable, and/or a wireless network. Various other connections are possible.

The talkers 130, 330 may or may not be or include a portion or all of the features of a computer system, such as a computer system 700 shown in FIG. 7 and described later. The talkers 130, 330 may be Ethernet AVB enabled and/or compatible. The talkers 130, 330 may be configured, adapted, operable, and/or enabled to communicate through and/or with an Ethernet AVB network using one or more standards or protocols. An example of a protocol associated with communications between the talkers 130, 330 and the networks 110, 310 may be the stream reservation protocol specified in IEEE 802.1Qat-2010. Alternatively or additionally, various other protocols, such as IEEE 802.1ak-2007 Multiple MAC Registration Protocol ("MMRP"), IEEE 802.1AS-2011 (gPTP), IEEE 802.1Qav-2009, and/or IEEE 1722-2011 may be used.

The talkers 130, 330 may perform various functions and/or be connected with or include various components. For example, the talkers 130, 330 may be connected with the networks 110, 310 and an input device, such as a musical instrument or microphone. Information and/or data may be sent to, received by, and/or otherwise be input to the talkers 130, 330 or a device connected with the talkers 130, 330. For example, a user may play an instrument or sing into a microphone connected with the talkers 130, 330 and information and/or data about the instrument, singing, and/or voice may be received by the talkers 130, 330.

While the talkers 130, 330 in the network communication systems 100, 300 may comprise and/or be described as, the physical devices themselves (such as a microphone), it should be appreciated that in some systems, the talkers 130, 330 may be or may include a computer or other electronic controlling device, which may be used and/or operated to control the talkers 130, 330 (such as a microphone). The computer may include some or all of the features of a computer system 700 shown in FIG. 7 and described later. In these systems, the computer or other electronic controller device may be AVB enabled and/or communicate directly with the networks 110, 310. In addition, the computer or other electronic controller device may communicate in various ways with the physical device and/or another device, such as with a wired or wireless connection. Various other alternatives are possible.

The talkers 130, 330 may process the information and/or data received in various ways. For example, the talkers 130, 330 may be configured to transform any signal received, such as the musical signal, from an analog signal to a digital signal. In other systems, a computing device may perform processing of received information and/or data, and may send the processed information and/or data to the talkers 130, 330. Various other processing functions may be performed by the talkers 130, 330 and/or devices in communication with the talkers 130, 330.

The listeners 140, 141, 242, 340, 341 may or may not be or include a portion or all of the features of a computer system, such as a computer system 700 shown in FIG. 7 and described later. The listeners 140, 141, 242, 340, 341 may be Ethernet AVB enabled and/or compatible. The listeners 140, 141, 242, 340, 341 may be configured, adapted, operable, and/or enabled to communicate through and/or with an Ethernet AVB network using one or more standards or protocols, such as the stream reservation protocol identified in IEEE 802.1Qat-2010 (SRP), IEEE 802.1Qav-2009, IEEE 802.1AS-2011 (gPTP), and/or IEEE 1722-2011. Alternatively, various other protocols, such as a MMRP, may be used.

The listeners 140, 141, 242, 340, 341 may be configured, adapted, and/or operable to receive information that includes data across, through, and/or using the networks 110, 310. For example the listeners 140, 141, 242, 340, 341 may be configured and/or adapted to receive a data stream passing across the networks 110, 310 such as an Ethernet AVB network. The information and/or data received by one or more of the listeners 140, 141, 242, 340, 341 may be, for example, the information and/or data sent by the talkers 130, 330, information and/or data sent by the talker/listeners 360, 362, information and/or data sent by the controllers 150, 350, and/or various other information and/or data sent through and/or using the networks 110, 310. In some systems, the listeners 140, 141, 242, 340, 341 may register for and/or receive a data stream from the talkers 130, 330 and/or from the talker/listeners 360, 362. Registration for and/or receipt of a data stream may or may not be received by the listeners 140, 141, 242, 340, 341 with a guaranteed bandwidth. Various other possibilities exist.

The listeners 140, 141, 242, 340, 341 may perform various functions and/or include or be connected with various components. For example, one or more of the listeners 140, 141, 242, 340, 341 may be connected with the networks 110, 310 and an output device, such as a speaker or television monitor. Information and/or data may be gathered and/or otherwise received by one or more of the listener 140, 141, 242, 340, 341 through the networks 110, 310. For example, information and/or data about notes played on a musical instrument may be transmitted by the talkers 130, 330 and/or the talker/listeners 360, 362 through the networks 110, 310 and/or be received by one or more of the listeners 140, 141, 242, 340, 341. The one or more of the listeners 140, 141, 242, 340, 341 may process the information and/or data received through the networks 110, 310. In addition, the one or more of the listeners 140, 141, 242, 340, 341 may output processed information and/or data to the speaker. For example, the one or more of the listeners 140, 141, 242, 340, 341 may output information and/or data related to the signal received through the networks 110, 310 to the speaker.

While the listeners 140, 141, 242, 340, 341 in the network communication systems 100, 300 may comprise and/or be described as physical devices (such as a speaker), it should be appreciated that in some systems, the listeners 140, 141, 242, 340, 341 may be or may include a computer or other electronic controlling device which may be used and/or be operated to control the listeners 140, 141, 242, 340, 341 (such as a speaker). The computer or other electronic controller device may have some or all of the features of a computer system 700 shown in FIG. 7 and described later. In these systems, the computer or other electronic controller device may be AVB enabled and/or communicate directly with the network 110. In these systems, the computer or other electronic controller device may communicate with the physical device and/or a different device in various ways, such as with a standard wired or wireless connection. Various other alternatives are possible.

The talker/listeners 360, 362 may be configured, adapted, operable, and/or enabled to send and receive information and/or data through the networks 110, 310. The talker/listeners 360, 362 may include the capabilities and functions of the talkers 130, 330 and the listeners 140, 141, 242, 340, 341. In some systems, all devices connected with the network 110 may be configured to perform the role of a talker/listener. In other systems, some or none of the devices connected with the network 110 may be configured to perform the role of a talker/listener. Accordingly, functions and/or attributes of the talkers 130, 330 and/or the listeners 140, 141, 242, 340, 341 may also be functions and/or attributes of the talker/listeners 360, 362. Various combinations are possible.

The controllers 150, 350 may or may not be or include a portion or all of the features of a computer system, such as a computer system 700 shown in FIG. 7 and described later. The controllers 150, 350 may be Ethernet AVB enabled and/or compatible. The controllers 150, 350 may be configured, adapted, operable, and/or enabled to communicate with and/or through an Ethernet AVB network, such as according to, through, and/or with a one or more standards or protocols, such as the stream reservation protocol outlined in IEEE 802.1Qat-2010. Alternatively, various other protocols, such as a MMRP, may be used.

The controllers 150, 350 may be or comprise a high-level application of an electronic device that is configured to communicate directly or indirectly with the talkers 130, 330, the listeners 140, 141, 242, 340, 341, and/or the talker/listeners 360, 362. The controllers 150, 350 may be configured to manage and/or control a connection of a data stream between two or more devices, such as between the talkers 130, 330 and one or more of the listeners 140, 141, 242, 340, 341. The controllers 150, 350 may be part of an electronic device or in communication with an electronic device that desires to establish and/or tear down a data stream between two devices. As an example, the controllers 150, 350 may be or may be in communication with a remote control. The remote control may be configured to issue a command, such as a "Play" command to the controllers 150, 350 which may instruct the controllers 150, 350 to establish a connection between the talkers 130, 330, the listeners 140, 141, 242, 340, 341, and/or the talker/listeners 360, 362.

FIGS. 1-3 show the controllers 150, 350 as electronic devices of the systems 100, 300 that are separate from the talkers 130, 330, the listeners 140, 141, 242, 340, 341, and the talker/listeners 360, 362. In other example network communication systems, the controllers 150, 350 may be components of one or more of the other electronic devices in the systems 100, 300, including the talkers 130, 330, the listeners 140, 141, 242, 340, 341 and/or the talker/listeners 360, 362. The components may be high-level applications of the other electronic devices. Where the controllers 150, 350 are components of the other electronic devices, the controllers 150, 350 may be configured to communicate with one or more components of the other electronic devices that are configured to perform the roles of the talkers, listeners, and/or talker/listeners. Further, the controllers 150, 350 may be configured to communicate with other devices for which the controllers 150, 350 are not components over the networks 110, 310 and/or through wired or wireless non-network connections. As an example, where the controller 150 is a component of the talker 130, the controller 150 may be configured to communicate with one or more components of the talker 130 that are configured to perform the role of the talker. For example, the controller 150 may be configured to send a stream latency message to one or more components of the talker 130 that are configured to calculate an offset of the presentation time and/or insert the presentation time into the data stream. The communications between the controller 150 and the components of the talker 130 that are configured to perform the role of the talker may be performed internal to the talker 130 and/or without communication over the network 110. In addition, the controller 150 may send latency requests, receive listener latency messages, and/or send the stream latency messages to the one or more of the listeners 140, 141, 242 over the network 110 or using a wired or wireless non-network connection between the talker 130 and one or more of the listeners 140, 141, 242.

Each of the electronic devices in the example network communications systems 100, 300 may include and/or be in communication with memory that may be used to store information and/or data, including latency information and/or information included in the listener latency messages, latency requests, stream latency messages, stream advertisements, replies to stream advertisements, and/or data streams, as examples. The memory may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory may include a cache or random access memory for a processor, such as processor 702 of computer system 700 described later. In alternative examples, the memory is separate from a processor, such as a cache memory of a processor, the system memory, or other memory. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory may be operable to store instructions executable by a processor. The functions, acts or tasks illustrated in the figures or described may be performed by a programmed processor executing the instructions stored in the memory. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

In some systems, the memory may be a separate and/or collective memory or database. The separate and/or collective memory or database may represent one database for both the electronic devices in the example network communication systems 100 and/or 300, including the talkers 130, 330, the listeners 140, 141, 242, 340, 341, the talker/listeners 360, 362, and/or the controllers 150, 350. The separate and/or collective memory or database may be continuously updated, or updated at various other intervals. In some systems, the separate and/or collective memory or database may collect and/or update information based on information and/or data about the application-layer messages and/or the data streams received and/or stored in the memory. Updates may be sent by the separate and/or collective memory or database to the memory at various intervals, such as every 10-15 seconds. In these systems, the memory may be the same.

In an alternative example, the memory may not be included in the example network communication systems 100 and/or 300, including the talkers 130, 330 the listeners 140, 141, 242, 340, 341, the talker/listeners 360, 362, and/or the controllers 150, 350. Rather, the memory may be included separately and/or be in communication with the electronic devices in the network communication systems 100, 300. In another alternative example systems, parts of a separate and/or collective memory or database may be extracted from an external database and stored in volatile memory in one or more of the electronic devices in the network communication systems 100 and/or 300 when one or more of the electronic devices in the network communication systems 100 and/or 300 are powered up. Various other examples, functions and/or features of the memory are possible.

The electronic devices of the example network communication systems 100 and/or 300, including the talkers 130, 330 the listeners 140, 141, 242, 340, 341, the talker/listeners 360, 362, and/or the controllers 150, 350, may comprise one or more hardware and/or software based components or modules that are configured to perform the roles of the talker, the listener, the talker/listener, and/or the controller. The components or modules may comprise computer instructions, computer code, digital logic, other software, hardware, or any combination thereof a part of which may be stored in the memory and/or any other storage device internal or external to the talkers 130, 330 the listeners 140, 141, 242, 340, 341, the talker/listeners 360, 362, and/or the controllers 150, 350 and that is executable by one or more processors.

Figure 5:
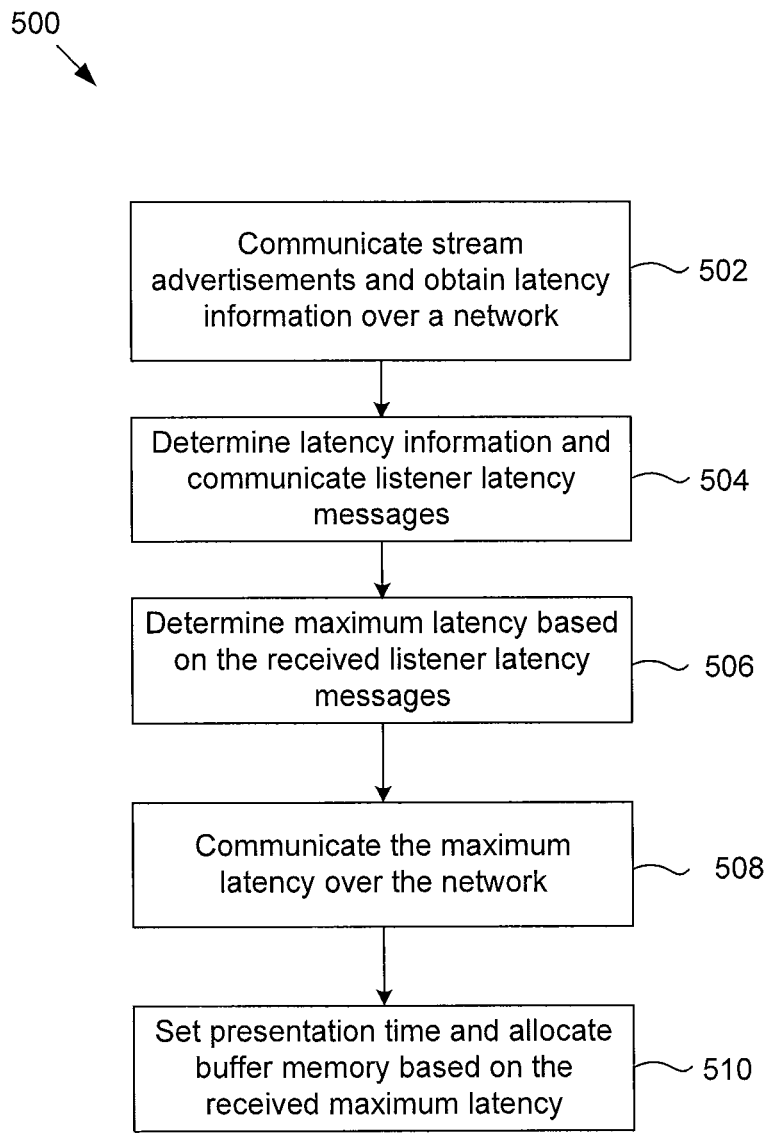
FIG. 5 is a flow diagram of an example method of optimizing a network communication system for latency.

FIG. 5 shows a flow diagram of an example method 500 of optimizing a network communication system for latency based on a determined maximum latency. At block 502, one or more stream advertisements associated with a stream ID are communicated across a network, such as an AVB network, from a talker to one or more listeners. The one or more stream advertisements may include a propagation delay field indicating a propagation delay through the network. Communicating the stream advertisement across the network may include passing the stream advertisements through one or more bridges located in the network. As the one or more stream advertisements are passed through the one or more bridges, latency for each of the bridges may be obtained. The propagation delay fields may be updated by appending to the propagation delay a delay or latency associated with each of the bridges. The delay or latency associated with the bridges may be a delay or latency period that the stream advertisement takes to be sent from an ingress port to an egress port of each of the bridges.

At block 504, the listeners receive the stream advertisements and determine an accumulated propagation delay from the propagation delay field in the stream advertisements. The listeners may further determine a total latency by adding to the accumulated propagation delay any delay time between physical media interfaces and media buffers of the listeners. The listeners may send the total latency to a controller, which may be a high-level application of an electronic device in the network communication system. At block 506, based on the total latencies received from the listeners, the controller may determine a maximum total latency. Where the network communication system has only one listener, the maximum total latency is the total latency received from the listener. At block 508, the controller may also generate one or more messages and send the maximum total latency information to the talker and the listeners. At block 510, the talker and listeners may receive the maximum total latency information, and the network communication system may be optimized for latency based on the maximum total latency information. The talker may receive the maximum total latency information from the controller and determine an offset to a presentation time of the data stream. The talker may generate the data stream, including the presentation time, and send the data stream over the network to the listeners. The presentation time may be an optimum presentation time because it is representative of a minimum time that the data stream may be buffered by the listeners before the data stream may be presented at the same time by all of the listeners. Also, at block 510, the listeners may receive the maximum total latency information from the controller and allocate buffer memory for buffering the data stream based on the maximum total latency information. An amount of buffer memory allocated may be representative of a minimum amount of buffer memory that may be allocated for the data stream to be presented at the same time by the listeners.

Figure 6:
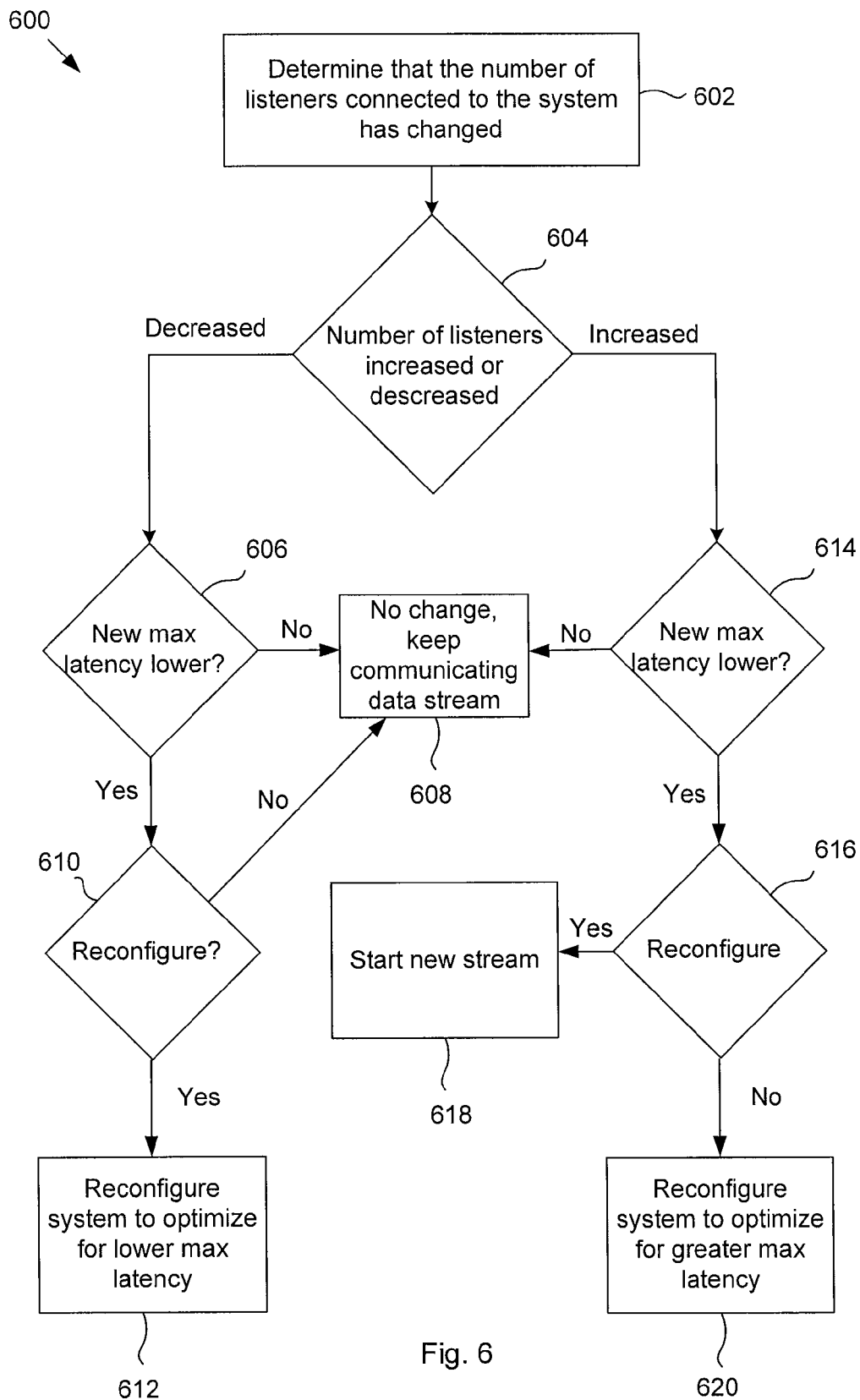
FIG. 6 is a flow diagram of an example method of determining whether to re-optimize a network communication system based on a change in a number of listeners.

FIG. 6 shows a flow diagram of an example method 600 of determining whether to re-optimize a network communication system based on a change in a number of listeners in the system. At block 602, a controller determines that the number of listeners in the system has changed. The controller may determine that the number of listeners in the system has changed by identifying one or more stream reservations being created between a talker and one or more new listeners, or by identifying one or more removals of a stream reservation between the talker and one or more of the listeners in the system. At block 604, the controller may determine whether the number of listeners has increased or decreased. If the number of listeners has decreased, then at block 606, the controller may determine whether a new maximum latency between the talker and any remaining listeners is less than the current maximum latency (i.e., the maximum latency between the talker and the listeners before one or more listeners disconnected from the system). If, the maximum latency between the talker and the remaining listeners has not decreased, then at block 608 the current maximum latency is unchanged and the remaining listeners may continue to receive the data stream from the talker. Alternatively, if the maximum latency between the talker and the remaining listeners has decreased, then at block 610, the controller may decide whether to reconfigure the system to optimize for latency. In some situations, the controller may determine that despite the decrease in the maximum latency, the system need not or should not be reconfigured. For example, the difference between the current maximum latency and the new maximum latency between the remaining listeners may be so small that the difference is negligible and/or not worth the resources to reconfigure the system. In one example, a predetermined difference threshold value may be established, and the controller may determine whether to reconfigure the system based on whether the difference between the current maximum latency and the new maximum latency is within the predetermined threshold. At block 610, if the controller determines not to reconfigure the system to optimize for latency, then the process goes back to block 608, where the current maximum latency is unchanged and the remaining listeners may continue to receive the data stream from the talker.

Alternatively, at block 610, the controller may determine to reconfigure the system for optimal latency. For example, the difference between the current maximum latency and the new maximum latency may be greater than a predetermined threshold. Where the controller determines to reconfigure the system to maximize for latency, then at block 612, the communication system may be reconfigured to optimize for latency. The current maximum latency may be set to the new lower maximum latency. The talker and/or the remaining listeners may remove their respective stream reservations and stop transmitting the data stream. The talker may determine a new presentation time based on new maximum latency information received from the controller and transmit the data stream with the new presentation time to the remaining listeners. Also, the listeners may reallocate buffer memory based on the received new maximum latency.

Referring back to block 604, if the number of listeners has increased, then at block 614, the controller may determine whether a new maximum latency between the talker and the listeners, including the added listeners, is greater than the current maximum latency (i.e., the maximum latency of the system before the number of listeners increased). If the new maximum latency is not greater than the current maximum latency, then at block 608, the current maximum latency is unchanged, and the listeners, including the newly added listeners, may receive the data stream having the current presentation time from the talker. Alternatively, if the new maximum latency is greater than the current maximum latency, then at block 616, the controller may determine whether to reconfigure the system to optimize for latency. In some situations, despite the new maximum latency being greater than the current maximum latency, the controller may determine not to reconfigure the system. For example the difference between the current maximum latency and the new maximum latency may be so small that the difference is negligible and/or not worth the resource to reconfigure the system. There may be other reasons to not reconfigure the system for optimum latency despite the new maximum latency being greater than current maximum latency. For example, the new listeners entering the communication system may be physically separated from a main area of the communication system that includes the listeners currently in the system. In addition or alternatively, the system may not need to be reconfigured because the new listeners entering the communication system do not need to have the same presentation times as the current listeners. Where the controller determines not to reconfigure the system for optimal latency, then the method proceeds to block 618, where the data streams sent to the current listeners continue to be sent to them. The connections between the talker and the current listeners do not need to be torn down and new maximum latency values are not determined. Additionally, one or more new data streams are sent to the new listeners. The new data streams may contain the same information as the data streams, except that the presentation times included in the data streams may include offsets that are based on the latencies associated with the newly entered listeners, and not on the latencies associated with the current listeners. As such, the presentation times included in the data streams sent to the newly entered listeners may be the same or different than the presentation times included in the data streams sent to the current listeners.

Alternatively, at block 616, where the controller determines to reconfigure the system for optimal latency, then at block 620, the communication system may be optimized for latency. The controller may send the new maximum latency to the talker and/or the listeners. The talker and the listeners may remove their respective stream reservations. In addition, the talker may generate a new presentation time based on the new maximum latency and transmit the data stream with the new presentation time to the listeners. Also, the listeners may reallocate buffer memory based on the received new maximum latency. Other situations are possible. For example, where a plurality of new listeners enters the system, the system may require that some of the new listeners present the data at the same time as the current listeners, while the other new listeners do not. In that case, the system may be reconfigured to optimize for latency even though some of the new listeners do not have to have the same presentation times as the current listeners.

Figure 7:
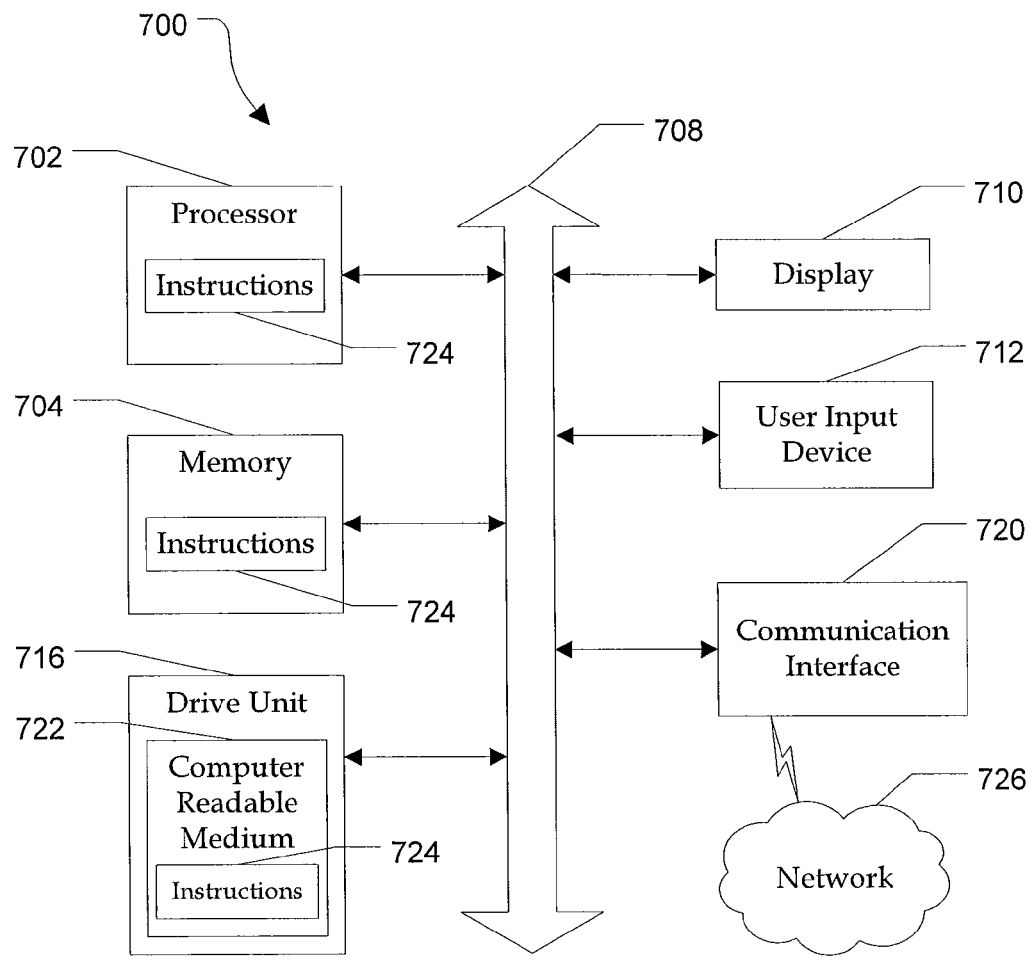
FIG. 7 is an example of a computer processing system for use with one or more components in the network communication system.

One or more of the talkers 130, 330, the listeners 140, 141, 242, 340, 341, the talker/listeners 360, 362, and/or the controllers 150, 350 shown in FIGS. 1, 2, and/or 3 may be and/or may include a portion or all of one or more computing devices of various kinds, such as the computing device in FIG. 7. FIG. 7 illustrates an example of a general computer system designated 700. Any of the components from the system 100 shown in FIGS. 1 and/or 2, and/or the system 300 shown in FIG. 3 may include a portion or all of the computer system 700. For example, in some examples, the computer system 700 may include only a processor and memory. The computer system 700 can include a set of instructions that can be executed to cause the computer system 700 to perform any one or more of the methods or computer based functions disclosed. The computer system 700 may operate as a standalone device or may be connected, e.g., using a network, to other computer systems or peripheral devices.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 700 can be implemented using electronic devices that provide voice, audio, video or data communication. Further, while a single computer system 700 is illustrated, the term "system" shall also be taken to include any collection of systems or sub-systems that individually or jointly execute a set, or multiple sets, of instructions to perform one or more computer functions.

In FIG. 7, the example computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The term "module" may be defined to include a plurality of executable modules. As described herein, the modules are defined to include software, hardware or some combination thereof executable by a processor, such as processor 702. Software modules may include instructions stored in memory, such as memory 704, or another memory device, that are executable by the processor 702 or other processor. Hardware modules may include various devices, components, circuits, gates, circuit boards, and the like that are executable, directed, and/or controlled for performance by the processor 702.

The computer system 700 may include a memory 704, such as a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 704 includes a cache or random access memory for the processor 702. In alternative examples, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 700 may or may not further include a display unit 710, such as a liquid crystal display (LCD), an organic light emitting diode (OLED), a flat panel display, a solid state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 716.

Additionally, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the computer system 700.

In a particular example, as depicted in FIG. 7, the computer system 700 may also include a disk or optical drive unit 716. The disk drive unit 716 may include a computer-readable medium 722 in which one or more sets of instructions 724, e.g. software, can be embedded. Further, the instructions 724 may embody one or more of the methods or logic as described. In a particular example, the instructions 724 may reside completely, or at least partially, within the memory 704 and/or within the processor 702 during execution by the computer system 700. The memory 704 and the processor 702 also may include computer-readable media as discussed above.

The present disclosure contemplates a computer-readable medium that includes instructions 724 or receives and executes instructions 724 responsive to a propagated signal so that a device connected to a network 726 can communicate voice, video, audio, images or any other data over the network 726. Further, the instructions 724 may be transmitted or received over the network 726 via a communication port or interface 720, and/or using a bus 708. The communication port or interface 720 may be a part of the processor 702 or may be a separate component. The communication port 720 may be created in software or may be a physical connection in hardware. The communication port 720 may be configured to connect with a network 726, external media, the display 710, or any other components in system 700, or combinations thereof. The connection with the network 726 may be a physical connection, such as a wired Ethernet connection or may be established wirelessly as discussed later. Likewise, the additional connections with other components of the system 700 may be physical connections or may be established wirelessly. The network 726 may alternatively be directly connected to the bus 708.

The network 726 may include wired networks, wireless networks, Ethernet AVB networks, or combinations thereof. The wireless network may be a cellular telephone network, an 802.11, 802.16, 802.20, 802.1Q or WiMax network. Further, the network 726 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules or parts of modules included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of optimizing a network communication system for latency, the method comprising:
   determining, with at least one processor, a plurality of latencies for a plurality of connections over a network between a talker and a plurality of listeners;
   determining, with the at least one processor, a maximum latency among the plurality of latencies, the maximum latency being used to determine a presentation time at which a data stream received from the talker is presented by the plurality of listeners, one or more data packets of the data stream received from the talker including the presentation time;
   determine a change in a number of bridges in the network responsive to one or more bridges being added or removed from the network,
   change the maximum latency to a new maximum latency based on the change in the number of bridges in the network; and
   send the new maximum latency to the talker.

2. The method of claim 1, where the presentation time comprises an earliest presentation time that the plurality of listeners can present the data stream simultaneously.

3. The method of claim 2, where the earliest presentation time comprises a minimum offset applied to a current network time.

4. The method of claim 3, where the minimum offset comprises a dynamic offset value that is less than a predetermined, fixed offset value for the network communication system that is indicative of a maximum offset value.

5. The method of claim 1, further comprising:
   determining, with the plurality of listeners, a minimum amount of buffer memory to allocate to buffer the data stream before the data stream is presented, the minimum amount of memory being based on the maximum latency.

6. The method of claim 1, further comprising:
   sending, with the plurality of listeners, the plurality of latencies to a high-level application to determine the maximum latency.

7. The method of claim 1, further comprising:
   generating, with the talker, the data stream comprising the presentation time.

8. The method of claim 1, further comprising:
   determining, with the at least one processor, a change in a number of listeners of the plurality of listeners connected to the network; and
   determining, with the at least one processor, whether to change the maximum latency based on the determined change in the number of listeners.

9. The method of claim 8, where the maximum latency comprises a current maximum latency, and where,
   if the change in the number of listeners comprises an increase in the number of listeners, determining whether to change the current maximum latency comprises:
   changing the current maximum latency to a maximum latency for the increased number of listeners where the maximum latency for the increased number of listeners is greater than the current maximum latency; and
   if the change in the number of listeners comprises a decrease in the number of listeners, determining whether to change the current maximum latency comprises:
   changing the current maximum latency to a maximum latency for the decreased number of listeners where the maximum latency for the decreased number of listeners is less than the current maximum latency.

10. The method of claim 8, where the presentation time comprises a current presentation time, and where determining whether to change the maximum latency comprises determining to change the maximum latency, the method further comprising:
    in response to determining to change the maximum latency:
    removing connections between the talker and the plurality of listeners;
    determining a new presentation time based on the changed maximum latency;
    re-establishing connections between the talker and the plurality of listeners; and
    sending the data stream having the new presentation time to the plurality of listeners.

11. A network communication system comprising:
a plurality of listeners configured to receive a data stream over a network, the plurality of listeners each comprising a physical media interface that is configured to output data in the received data stream;
a talker in communication with the plurality of listeners, the talker configured to transmit the data stream over the network, the data stream having a presentation time having an optimal offset indicative of a minimum amount of buffering for the plurality of listeners to present the data in the data stream simultaneously; and
a controller in communication with the plurality of listeners and the talker, the controller being configured to receive listener latency messages from the plurality of listeners, calculate a maximum latency among a plurality of latencies for connections between the talker and the plurality of listeners, send the maximum latency to the talker, the maximum latency being used to determine the optimal offset, determine a change in a number of bridges in the network responsive to one or more bridges being added or removed from the network, change the maximum latency to a new maximum latency based on the change in the number of bridges in the network, and send the new maximum latency to the talker.

12. The network communication system of claim 11, where each listener of the plurality of listeners is further configured to:
receive a stream advertisement from the talker, the stream advertisement having an accumulated propagation delay indicative of a time taken by one or more bridges in the network to pass the stream advertisement through the network toward the listener, each of the one or more bridges being configured to update a propagation delay field of the stream advertisement with a calculated bridge latency from an ingress port of the bridge to an egress port of the bridge; and
send latency information indicative of a latency of the plurality of latencies to the controller, the latency information being based, at least in part, on the accumulated propagation delay.

13. The network communication system of claim 11, where each listener of the plurality of listeners is further configured to:
allocate a minimum amount of buffer memory to buffer the data stream before presenting the data stream to the physical media interface, the minimum amount of buffer memory being based on the maximum latency.

14. The network communication system of claim 11, where the talker is further configured to:
receive the maximum latency from the controller;
determine the optimal offset to be applied to a current network time based on the maximum latency, the optimal offset and the current network time used to calculate an optimal presentation time; and
generate the data stream having the optimal presentation time.

15. The network communication system of claim 11, where the maximum latency comprises a current maximum latency, and where the presentation time comprises a current presentation time;
where the controller is configured to:
determine a change in a number of listeners of the plurality of listeners,
change the current maximum latency to a new maximum latency based on the change in the number of listeners of the plurality of listeners; and
send the new maximum latency to the talker; and
where the talker is configured to:
stop sending the data stream having the current presentation time, and determine a new presentation time based on the new maximum latency; and
send the data stream having the new presentation time to at least some of the plurality of listeners.

16. The network communication system of claim 11, further comprising:
at least one talker/listener that is configured to:
receive the data stream from the talker;
send the data stream over the network toward at least one of the plurality of listeners; and
send latency information indicative of propagation delay between the talker and the at least one talker/listener to the controller;
where the controller is configured to determine the maximum latency based on the latency information received from the at least one talker/listener and latency information received from the plurality of listeners.

17. The network communication system of claim 11, further comprising:
a monitoring and optimization system that is configured to:
display the plurality of latencies of the connections in the network communication system; and
provide a user interface to set presentation times for various paths in the network communication system.

18. One or more non-transitory computer readable storage media encoded with software comprising computer executable instructions and when the software is executed operable to:
determine a plurality of latencies for a plurality of connections over a network between a talker and a plurality of listeners, the plurality of listeners having established or requested to establish a stream reservation to receive a data stream from the talker;
determine a maximum latency among the plurality of latencies;
send the maximum latency to the talker to determine an optimum presentation time at which a data stream is presented by the plurality of listeners simultaneously;
determine a change in a number of listeners of the plurality of listeners responsive to one or more listeners entering and/or leaving the network,
change the maximum latency to a first new maximum latency based on the change in the number of listeners of the plurality of listeners;
send the first new maximum latency to the talker;
determine a change in a number of bridges in the network responsive to one or more bridges being added or removed from the network,
change the first new maximum latency to a second new maximum latency based on the change in the number of bridges in the network; and
send the second new maximum latency to the talker.

19. The one or more non-transitory computer readable storage media of claim 18, further comprising software that, when executed is further operable to:
generate a minimum offset based on the maximum latency;
add the minimum offset to a current network time to generate the optimum presentation time;
generate the data stream having the optimum presentation time; and
transmit the data stream over the network to the plurality of listeners.

20. The one or more non-transitory computer readable storage media of claim 18, further comprising software that, when executed is further operable to:
- determine an optimum amount of buffer memory to allocate to buffer the data stream until the data stream is presented by the plurality of listeners simultaneously.

21. The one or more non-transitory computer readable storage media of claim 18, further comprising software that, when executed is further operable to:
- stop sending the data stream having the optimum presentation time;
- determine a new optimum presentation time based on the new maximum latency;
- generate the data stream having the new optimum presentation time; and
- send the data stream having the new optimum presentation time to at least one of the plurality of listeners.

* * * * *